United States Patent
Gu et al.

(10) Patent No.: US 11,429,903 B2
(45) Date of Patent: Aug. 30, 2022

(54) PRIVACY-PRESERVING ASYNCHRONOUS FEDERATED LEARNING FOR VERTICAL PARTITIONED DATA

(71) Applicants: JINGDONG DIGITS TECHNOLOGY HOLDING CO., LTD., Beijing (CN); JD FINANCE AMERICA CORPORATION, Wilmington, DE (US)

(72) Inventors: Bin Gu, Mountain View, CA (US); Harry Huang, Mountain View, CA (US)

(73) Assignees: JINGDONG DIGITS TECHNOLOGY HOLDING CO., LTD., Beijing (CN); JD FINANCE AMERICA CORPORATION, Wilmington, DE (US)

( * ) Notice: Subject to any disclaimer, the term of this patent is extended or adjusted under 35 U.S.C. 154(b) by 287 days.

(21) Appl. No.: 16/910,238

(22) Filed: Jun. 24, 2020

(65) Prior Publication Data

US 2022/0004933 A1    Jan. 6, 2022

(51) Int. Cl.
G06N 20/20        (2019.01)
G06F 16/901       (2019.01)
G06F 17/16        (2006.01)

(52) U.S. Cl.
CPC ......... *G06N 20/20* (2019.01); *G06F 16/9027* (2019.01); *G06F 17/16* (2013.01)

(58) Field of Classification Search
CPC ...... G06N 20/20; G06F 16/9027; G06F 17/16
See application file for complete search history.

(56) References Cited

U.S. PATENT DOCUMENTS

| 2014/0006324 A1 | 1/2014 | Dong et al. |
| 2021/0174243 A1* | 6/2021 | Angel .................... G06N 20/20 |

FOREIGN PATENT DOCUMENTS

| CN | 110598870 A | 12/2019 |
| CN | 111177249 A | 5/2020 |
| CN | 111325629 A | 6/2020 |

OTHER PUBLICATIONS

Nadeem Badshah, Facebook to contact 87 million users affected by data breach, The Guardian, Apr. 8, 2018.
(Continued)

*Primary Examiner* — Curtis B Odom
(74) *Attorney, Agent, or Firm* — Scully, Scott, Murphy & Presser

(57) ABSTRACT

System and method for training a federated learning model asynchronously. The system includes a coordinator, an active computing device and a passive computing device in communication with each other. The active computing device has a processor and a storage device storing computer executable code. The computer executable code is configured to: train the federated learning model in the active computing device using dimensions of an instance in the active computing device; and instruct the at least one passive computing device to train the federated learning model in the at least one passive computing device using dimensions of the instance in the at least one passive computing device. The training instances in the active and the at least one passive computing devices do not correspond to each other at the same training time.

20 Claims, 18 Drawing Sheets

(56) References Cited

OTHER PUBLICATIONS

Amir Beck and Luba Tetruashvili, On the Convergence of block coordinate descent type methods, SIAM Journal on Optimization, 2013, 23(4), 2037-2060.

Léon Bottou, Large-scale machine learning with stochastic gradient descent, Proceedings of COMPSTAT'2010, Springer, 2010, 177-186.

Chih-Chung Chang and Chih-Jen Lin, LIBSVM: a library for support vector machines, ACM Transactions on Intelligent Systems and Technology, 2011, 2:1-27.

Kewei Cheng, Tao Fan, Yilun Jin, Yang Liu, Tianjian Chen, and Qiang Yang, Secureboost: A lossless federated learning framework, 2019, arXiv:1901.08755.

Bryan Conroy and Paul Sajda, Fast, exact model selection and permutation testing for l2-regularized logistic regression. International Conference on Artificial Intelligence and Statistics, 2012, 246-254.

Aaron Defazio, Francis Bach, and Simon Lacoste-Julien, SAGA: a fast incremental gradient method with support for non-strongly convex composite objectives, NIPS'14: Proceedings of the 27th International Conference on Neural Information Processing Systems, 2014, 1646-1654.

Wenliang Du and Mikhail J. Atallah, Privacy-preserving cooperative statistical analysis, Proceedings of the 17th Annual Computer Security Applications Conference, 2001, 102-110.

Regulation (EU) 2016/679 of the European Parliament and of the Council of Apr. 27, 2016, https://eur-lex.europa.eu/legal-content/EN/TXT/?uri=CELEX:02016R0679-20160504.

Cong Fang, Chris Junchi Li, Zhouchen Lin, and Tong Zhang, SPIDER: near-optimal non-convex optimization via stochastic path-integrated differential estimator, Advances in Neural Information Processing Systems 31, 2018, 689-699.

Adria Gascon, Phillipp Schoppmann, Borja Balle, Mariana Raykova, Jack Doerner, Samee Zahur, and David Evans, Secure linear regression on vertically partitioned datasets, IACR Cryptology ePrint Archive, 2016, 892.

Adria Gascon, Phillipp Schoppmann, Borja Balle, Mariana Raykova, Jack Doerner, Samee Zahur, and David Evans, Privacy-preserving distributed linear regression on high-dimensional data, Proceedings on Privacy Enhancing Technologies, 2017, (4):345-364.

Richard L. Graham, Timothy S. Woodall, and Jeffrey M. Squyres, Open MPI: A flexible high performance MPI, International Conference on Parallel Processing and Applied Mathematics, 2005, 228-239.

Bin Gu, Zhouyuan Huo, Cheng Deng, and Heng Huang, Faster derivative-free stochastic algorithm for shared memory machines, Proceedings of the 35th International Conference on Machine Learning, 2018, 1807-1816.

Bin Gu, Zhouyuan Huo, and Heng Huang, Asynchronous stochastic block coordinate descent with variance reduction, 2016, arXiv:1610.09447.

Stephen Hardy, Wilko Henecka, Hamish Ivey-Law, Richard Nock, Giorgio Patrini, Guillaume Smith, and Brian Thorne, Private federated learning on vertically partitioned data via entity resolution and additively homomorphic encryption, 2017, arXiv:1711.10677.

Thomas Hofmann, Aurelien Lucchi, Simon Lacoste-Julien, and Brian McWilliams, Variance reduced stochastic gradient descent with neighbors, Advances in Neural Information Processing Systems 28, 2015, 2305-2313.

Zhouyuan Huo and Heng Huang, Asynchronous mini-batch gradient descent with variance reduction for non-convex optimization, Thirty-First AAAI Conference on Artificial Intelligence, 2017, 2043-2049.

Alan F. Karr, Xiaodong Lin, Ashish P. Sanil and Jerome P. Reiter, Privacy-preserving analysis of vertically partitioned data using secure matrix products, Journal of Official Statistics, 2009, 25(1):125-138.

Vyacheslav Kungurtsev, Malcolm Egan, Bapi Chatterjee, and Dan Alistarh, Asynchronous stochastic subgradient methods for general nonsmooth nonconvex optimization, 2019, arXiv:1905.11845.

Rémi Leblond, Fabian Pedregosa, and Simon Lacoste-Julien, ASAGA: Asynchronous parallel SAGA, Proceedings of the 20th International Conference on Artificial Intelligence and Statistics, 2017, 54:46-54.

Xingguo Li, Tuo Zhao, Raman Arora, Han Liu, and Mingyi Hong, An improved convergence analysis of cyclic block coordinate descent-type methods for strongly convex minimization, Proceedings of the 19th International Conference on Artificial Intelligence and Statistics, 2016, 51:491-499.

Xingguo Li, Tuo Zhao, Raman Arora, Han Liu, and Mingyi Hong, On faster convergence of cyclic block coordinate descent-type methods for strongly convex minimization, J. Mach. Learn. Res. 18, 2018, 1-24.

Yang Liu, Yingting Liu, Zhijie Liu, Junbo Zhang, Chuishi Meng, and Yu Zheng, 2019, arXiv.1905.10053.

Yang Liu, Zhuo Ma, Ximeng Liu, Siqi Ma, Surya Nepal, and Robert H. Deng, Boosting privately: privacy-preserving federated extreme boosting for mobile crowdsensing, Cryptography and Security, 2019, arXiv:1907.10218.

Horia Mania, Xinghao Pan, Dimitris Papailiopoulos, Benjamin Recht, Kannan Ramchandran, and Michael I Jordan, Perturbed iterate analysis for asynchronous stochastic optimization, 2015, arXiv:1507.06970.

Qi Meng, Wei Chen, Jingcheng Yu, Taifeng Wang, Zhi-Ming Ma, and Tie-Yan Liu, Asynchronous stochastic proximal optimization algorithms with variance reduction, 2016, arXiv:1609.08435.

Yu Nesterov, Efficiency of coordinate descent methods on huge-scale optimization problems, SIAM Journal on Optimization, 2012, 22(2):341-362.

Lam M Nguyen, Jie Liu, Katya Scheinberg, and Martin Takae, SARAH: A novel method for machine learning problems using stochastic recursive gradient, Proceedings of the 34th International Conference on Machine Learning, 2017, 70: 2613-2621.

Richard Nock, Stephen Hardy, et al., Entity resolution and federated learning get a federated resolution, 2018, arXiv preprint arXiv:1803.04035.

Nhan H Pham, Lam M Nguyen, Dzung T Phan, and Quoc Tran-Dinh, ProxSARAH: An efficient algorithmic framework for stochastic composite nonconvex optimization, 2019, arXiv:1902.05679.

Conrad Sanderson and Ryan Curtin, Armadillo: a template-based C++ library for linear algebra, Journal of Open Source Software, 2016, 1(2):26.

Ashish P. Sanil, Alan F. Karr, et al., Privacy preserving regression modelling via distributed computation, Proceedings of the Tenth ACM SIGKDD International Conference on Knowledge Discovery and Data Mining, 2004, 677-682.

Mark Schmidt, Nicolas Le Roux, and Francis Bach, Minimizing finite sums with the stochastic average gradient, Mathematical Programming B, Springer, 2017,162(1-2):83-112.

Xia Shen, Moudud Alam, Freddy Fikse, and Lars Ronnegard, A novel generalized ridge regression method for quantitative genetics, Genetics, 2013, 193(4):1255-1268.

Jinhyun So, Basak Guler, Amir Salman Avestimehr, and Payman Mohassel, CodedPrivateML: A Fast and Privacy-Preserving Framework for Distributed Machine Learning, 2019, arXiv:1902.00641.

Johan AK Suykens and Joos Vandewalle, Least squares support vector machine classifiers, Neural Processing Letters, 1999, 9(3):293-300.

Jaideep Vaidya and Chris Clifton, Privacy preserving association rule mining in vertically partitioned data, Proceedings of the Eighth ACM SIGKDD International Conference on Knowledge Discovery and Data Mining, 2002, 639-644.

Li Wan, Wee Keong Ng, Shuoguo Han, and Vincent C.S. Lee, Privacy preservation for gradient descent methods, Proceedings of the 13th ACM SIGKDD International Conference on Knowledge Discovery and Data Mining, 2007, 775-783.

ZheWang, Kaiyi Ji, Yi Zhou, Yingbin Liang, and Vahid Tarokh, SpiderBoost: A class of faster variance-reduced algorithms for nonconvex optimization, 2018, arXiv:1810.10690.

(56) References Cited

OTHER PUBLICATIONS

Lin Xiao and Tong Zhang, A proximal stochastic gradient method with progressive variance reduction, SIAM Journal on Optimization, 2014, 24(4): 2057-2075.
Qiang Yang, Yang Liu, Tianjian Chen, and Yongxin Tong, Federated machine learning: Concept and applications, ACM Transactions on Intelligent Systems and Technology (TIST), 2019, 10(2): article 12.
Hwanjo Yu, Jaideep Vaidya, and Xiaoqian Jiang, Privacy-preserving SVM classification on vertically partitioned data, Pacific-Asia Conference on Knowledge Discovery and Data Mining, Springer, 2006, 647-656.
Gong-Duo Zhang, Shen-Yi Zhao, Hao Gao, and Wu-Jun Li, Feature-distributed SVRG for high-dimensional linear classification, 2018, arXiv:1802.03604.
Shen-Yi Zhao and Wu-Jun Li, Fast asynchronous parallel stochastic gradient descent: a lock-free approach with convergence guarantee, Thirtieth AAAI Conference on Artificial Intelligence, 2016, 2379-2385.
Ian Goodfellow, Yoshua Bengio, Aaron Courville, Deep learning, MIT Press, 2016, http://www.deeplearningbook.org.
PCT/CN2021/102075, International Search Report and the Written Opinion of the International Searching Authority, dated Sep. 24, 2021.

\* cited by examiner

Table 1

| | Classification Tasks | | | | | | Regression Tasks | |
|---|---|---|---|---|---|---|---|---|
| | Financial | | Large-Scale | | | | | |
| | UCICreditCard | GiveMeSomeCredit | news20 | rcv1 | url | webspam | E2006-tfidf | YearPredictionMSD |
| #Train | 24,000 | 96,257 | 15,997 | 677,399 | 1,916,904 | 280,000 | 16,087 | 463,715 |
| #Test | 6,000 | 24,012 | 3,999 | 20,242 | 479,226 | 70,000 | 3,308 | 51,630 |
| #Feature | 90 | 92 | 1,355,191 | 47,236 | 3,231,961 | 16,609,143 | 150,360 | 90 |

FIG. 8

Table 2

| Dataset | Speedup | | |
|---|---|---|---|
| | SGD | SVRG | SAGA |
| UCICreditCard | 1.82 | 1.93 | 1.95 |
| GiveMeSomeCredit | 1.89 | 2.15 | 2.11 |
| new20 | 3.37 | 2.84 | 2.89 |
| rcv1 | 3.7 | 2.64 | 2.28 |
| url | 2.74 | 2.51 | 2.38 |
| webspam | 1.96 | 1.97 | 1.99 |
| E2006-tfidf | 3.32 | 2.89 | 2.51 |
| YearPredictionMSD | 2.03 | 2.24 | 2.26 |

PRIVACY-PRESERVING ASYNCHRONOUS FEDERATED LEARNING FOR VERTICAL PARTITIONED DATA

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD OF THE DISCLOSURE

The present disclosure relates generally to federated learning, and more specifically related to systems and methods of privacy-preserving asynchronous federated learning for vertically partitioned data.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Federated learning is a machine learning technique that trains an algorithm across multiple decentralized edge devices or servers holding local data samples, without exchanging their data samples. However, it is a challenge to preserve sufficient privacy when data are exchanged frequently among the devices.

Therefore, an unaddressed need exists in the art to address the aforementioned deficiencies and inadequacies.

SUMMARY OF THE DISCLOSURE

In certain aspects, the present disclosure relates to a system for training a federated learning model asynchronously. The system includes an active computing device, at least one passive computing device, and a coordinator that are in communication with each other. Each of the active and passive computing devices has the federated learning model and local data. The active computing device has a processor and a storage device storing computer executable code. The computer executable code, when executed at the processor, is configured to: train the federated learning model in the active computing device using dimensions of multiple training instances in the active computing device; and instruct the at least one passive computing device to train the federated learning model in the at least one passive computing device using dimensions of the training instances in the at least one passive computing device. The training instances in the active and the at least one passive computing devices are indexed, and index of one of the training instances picked up by the at least one passive computing device is independent from index of one of the training instances picked up by the active computing device at the same time, such that training of the federated learning model in the active computing device and training of the federated learning model in the at least one passive computing device are asynchronous. Kindly note the training instances in the active computing device is not the same as the training instances in the at least one passive computing device.

In certain embodiments, parameters of the federated learning model include a constant learning rate.

In certain embodiments, transfer of intermediate results between the active worker and the at least one passive worker is performed using a tree-structured scheme via the coordinator. The intermediate result could be, for example, dot products and adjusted dot products.

In certain embodiments, the computer executable code is configured to train the federated learning model in the active computing device by: picking up i-th of the training instances in the active computing device, where i is the index of the training instances; computing an active dot product between current model weight in the active computing device and the i-th of the instances in the active computing device; instructing the at least one passive computing device to compute a passive dot product between current model weight in the at least one passive computing device and i-th of the training instances in the at least one passive computing device; summating the active and passive dot products to obtain summated dot product; calculating stochastic gradient of the federated learning model using the summated dot product; and updating the model weight using the stochastic gradient and learning rate of the federated learning model. In certain embodiments, the stochastic gradient is calculated using $\hat{v}_i^l = \nabla_{G_i} f_i(\hat{w}) \, f_i(\hat{w})$ is regularized loss function corresponding to the loss of the i-th instance, and $\nabla_{G_i} f_i(\hat{w})$ is the gradient of the regularized loss in regard to dimensions of the i-th instance in the active computing device. Kindly note the i-th training instance in the active computing device is not the same as the i-th training instance in the at least one passive computing device. The i-th training instance in the active computing device may include some dimensions of the instance, while the i-th training instance in the at least one passive computing device may include some other dimensions of the instance.

In certain embodiments, the computer executable code is configured to train the federated learning model in the active computing device by: for each of a first number of iterations: calculating a full local gradient for the instances in the active worker; performing in parallel and independently in each of the active worker and the at least one passive worker; picking up one of the instances; computing a current dot product between a current model weight and the one of the instances and a reference dot product between a reference model weight and the one of the instances; instructing the at least one passive computing device to compute its current dot product and its reference dot product using an instance corresponding to the one of the instances; summating the current dot products from the active and the at least one passive computing device to obtain summated current dot product, and summating the reference dot products from the active and the at least one passive computing device to obtain summated reference dot product; calculating stochastic gradient of the federated learning model using the summated current dot product and the summated reference dot product; and updating the model weight using the stochastic gradient and learning rate of the federated learning model to obtain updated model weight; and defining the updated model weight as a new reference model weight. In certain embodiments, the stochastic gradient is calculated using $\hat{v}_i^l = \nabla_{G_i} f_i(\hat{w}) - \nabla_{G_i} f_i(w^s) + \nabla_{G_i} f(w^s) \, f_i(\hat{w})$ is regularized loss function corresponding to the loss of the i-th instance, $f_i(w^s)$ is regularized loss function of the i-th instance in regard to reference model weight, $f(w^s)$ is the regularized empirical risk, and $\nabla_{G_i} f_i(\hat{w})$, $\nabla_{G_i} f_i(w^s)$, and $\nabla_{G_i} f(w^s)$ are respectively the gradients of $f_i(\hat{w})$, $f_i(w^s)$, and $f(w^s)$ in regard to dimensions of the i-th of the instances in the active computing device. In certain embodiments, the step of summating the current dot products is performed using a first tree-structured scheme, the step of summating the reference dot products is performed using a second tree-structured scheme, and the first tree-structured scheme is significantly different from the second tree-structured scheme.

In certain embodiments, the computer executable code is configured to train the federated learning model in the active computing device by: calculating a local gradient for the instances in the active worker; performing in parallel and independently in each of the active worker and the at least one passive worker: picking up one of the instances; computing a current dot product between a current model weight and the one of the instances; instructing the at least one passive computing device to compute its current dot product using an instance corresponding to the one of the instances; summating the current dot products from the active and the at least one passive computing device to obtain summated dot product; calculating stochastic gradient of the federated learning model using the summated dot product; and updating the model weight using the stochastic gradient and learning rate of the federated learning model to obtain updated model weight, and updating the local gradient. In certain embodiments, the stochastic gradient is calculated using $$\hat{v}_i^l = \nabla_{G_i} f_i(\hat{w}) - \hat{\alpha}_i^l + \frac{1}{n} \sum_{i=1}^{n} \hat{\alpha}_i^l,$$

$f_i(\hat{w})$ is regularized loss function corresponding to the loss of the i-th instance, $\nabla_{G_i} f_i(\hat{w})$ is the gradients of $f_i(\hat{w})$ in regard to dimensions of the i-th instance in the active computing device, and $\hat{\alpha}_i^l$ is the local gradient in the active computing device.

In certain embodiments, the computer executable code is configured to, after the federated learning model is trained, predict a value of an input instance by: calculating a dot product between model weight and the input instance for each of the active worker and the at least one passive worker; and summating the dot products from the active worker and the at least one passive worker using a tree-structured communication to obtain summated dot product, where the summated dot product is the value predicted for the input instance.

In certain embodiments, the computer executable code is configured to, after the federated learning model is trained, predict a value of an input instance by: for each of the active worker and the passive worker: generating a random number, calculating a dot product between model weight and the input instance, and adding the random number to the dot product to obtain an adjusted dot product; summating the adjusted dot products from the active worker and the at least one passive worker using a first tree-structured communication to obtain summated adjusted dot product; summating the random numbers from the active worker and the at least one passive worker using a second tree-structured communication to obtain summated random number; and subtracting the summated random number from the summated adjusted dot product to obtain summated dot product, where the summated dot product is the value predicted for the input instance.

In certain aspects, the present disclosure relates to a method. In certain embodiments, the method includes: training a federated learning model in an active computing device, by the active computing device, using dimensions of a plurality of training instances in the active computing device; and instructing at least one passive computing device to train a federated learning model in the at least one passive computing device, by the at least one passive computing device, using dimensions of the plurality of training instances in the at least one passive computing device, where the active and the at least one passive computing device is in communication with each other, the plurality of training instances in the active and the at least one passive computing devices are indexed, and index of one of the plurality of training instances picked by the at least one passive computing device is independent from index of one of the plurality of training instances picked by the active computing device at the same time, such that training of the federated learning model in the active computing device and training of the federated learning model in the at least one passive computing device are asynchronous.

In certain embodiments, parameters of the federated learning models include a constant learning rate, and transfer of intermediate results between the active worker and the at least one passive worker is performed using a tree-structured scheme via a coordinator in communication with the active and the at least one passive computing device.

In certain embodiments, the step of training the federated learning model in the active computing device includes: picking up i-th of the training instances in the active computing device, where i is the index of the training instances; computing an active dot product between current model weight in the active computing device and the i-th of the training instances in the active computing device; instructing the at least one passive computing device to compute a passive dot product between current model weight in the at least one passive computing device and i-th of the training instances in the at least one passive computing device; summating the active and passive dot products to obtain summated dot product; calculating stochastic gradient of the federated learning model using the summated dot product; and updating the model weight using the stochastic gradient and learning rate of the federated learning model. In certain embodiments, the stochastic gradient is calculated using $\hat{v}_i^l = \nabla_{G_i} f_i(\hat{w})$, $f_i(\hat{w})$ is regularized loss function corresponding to the loss of the i-th instance, and $\nabla_{G_i} f_i(\hat{w})$ is the gradient of the regularized loss function of the i-th instance in regard to dimensions in the active computing device.

In certain embodiments, the step of training the federated learning model in the active computing device includes: for each of a first number of iterations: calculating a full local gradient for the instances in the active worker; performing in parallel and independently in each of the active worker and the at least one passive worker: picking up one of the instances; computing a current dot product between a current model weight and the one of the instances and a reference dot product between a reference model weight and the one of the instances; instructing the at least one passive computing device to compute its current dot product and its reference dot product using an instance corresponding to the one of the instances; summating the current dot products from the active and the at least one passive computing device to obtain summated current dot product, and summating the reference dot products from the active and the at least one passive computing device to obtain summated reference dot product; calculating stochastic gradient of the federated learning model using the summated current dot product and the summated reference dot product; and updating the model weight using the stochastic gradient and learning rate of the federated learning model to obtain updated model weight; and defining the updated model weight as a new reference model weight. In certain embodiments, the stochastic gradient is calculated using $\hat{v}_i^l =$ $\nabla_{G_l} f_i(\hat{w}) - \nabla_{G_l} f_i(w^s) + \nabla_{G_l} f(w^s)$, $f_i(\hat{w})$ is regularized loss corresponding to the loss of the i-th instance, $f_i(w^s)$ is regularized loss of the i-th instance in regard to reference model weight, $f(w^s)$ is the regularized empirical risk, and $\nabla_{G_l} f_i(\hat{w})$, $\nabla_{G_l} f_i(w^s)$, and $\nabla_{G_l} f(w^s)$ are respectively the gradients of $f_i(\hat{w})$, $f_i(w^s)$, and $f(w^s)$ in regard to the dimensions in the active computing device. In certain embodiments, the step of summating the current dot products is performed using a first tree-structured scheme, the step of summating the reference dot products is performed using a second tree-structured scheme, and the first tree-structured scheme is significantly different from the second tree-structured scheme.

In certain embodiments, the step of training the federated learning model in the active computing device includes: calculating a local gradient for the instances in the active computing device;

performing in parallel and independently in each of the active worker and the at least one passive worker: picking up one of the instances; computing a current dot product between a current model weight and the one of the instances; instructing the at least one passive computing device to compute its current dot product using an instance corresponding to the one of the instances; summating the current dot products from the active and the at least one passive computing device to obtain summated dot product; calculating stochastic gradient of the federated learning model using the summated dot product; and updating the model weight using the stochastic gradient and learning rate of the federated learning model to obtain updated model weight, and updating the local gradient. In certain embodiments, the stochastic gradient is calculated using $$\hat{v}_i^l = \nabla_{G_l} f_i(\hat{w}) - \hat{\alpha}_i^l + \frac{1}{n} \sum_{i=1}^n \hat{\alpha}_i^l,$$

$f_i(\hat{w})$ is regularized loss corresponding to the loss function of the i-the instance, $\nabla_{G_l} f_i(\hat{w})$ is the gradients of $f_i(\hat{w})$ in regard to the dimensions in the active computing device, and $\hat{\alpha}_i^l$ is the local gradient in the active computing device.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 8 shows datasets used in the experiments according to certain embodiments of the present disclosure.

OVERVIEW OF THE DISCLOSURE

Figure 1A:
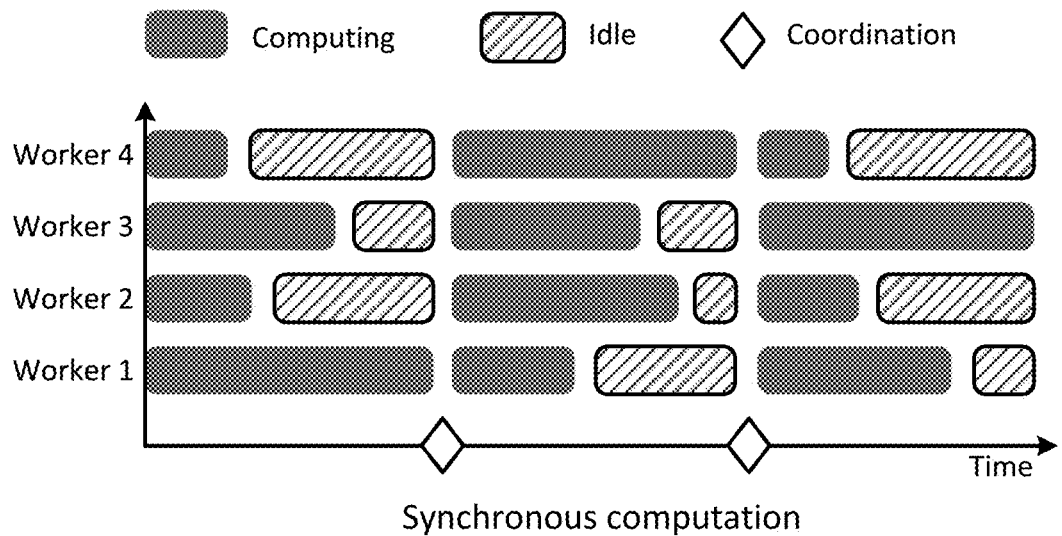
FIG. 1A schematically depicts synchronous computation.

In certain embodiments, the model uses symbols and equations, which are defined as follows:

SGD is an abbreviation of stochastic gradient descent. SVRG is an abbreviation of stochastic variance reduced gradient. SAGA is a fast incremental gradient method proposed by Aaron Defazio and Francis Bach in 2014. VP is an abbreviation of vertically partitioned, or vertically partitioned data, which is a common data distribution in federated learning. AFSGD-VP is an abbreviation for asynchronous federated SGD algorithm on vertically partitioned data, AFSVRG-VP is an abbreviation for asynchronous federated SVRG algorithm on vertically partitioned data, and AFSAGA-VP is an abbreviation for asynchronous federated SAGA algorithm on vertically partitioned data.

x represents instances of data, which could be available in all workers (computing devices) or servers in federated learning. $x_i$ is one of the instances that is indexed by i, where i is selected from 1 to n, and n is a positive integer. n represents the total number of instances. $(x_i)_{\mathcal{G}_l}$ is the instance in a local worker l. Each instance $x_i$ has d dimensions, and each dimension represents a feature of the instance. The instance $x_i$ may be distributed in different workers, and each work may include certain features of the instance corresponding to certain of the dimensions. y represent the labels of the instances, and $y_i$ is the label of the instance $x_i$. The value of each y can be +1 or −1 for a binary problem, and can be a real number for a regression problem. S is a sample set including the instance data $x_i$ and its corresponding label $y_i$, and the sample set can be represented as $S=\{(x_i, y_i)\}_{i=1}^n$. $D^l$ are local data on l-the worker, which has the same size to the sample set S.

$\mathbb{R}$ is a real number, $\mathbb{R}^d$ indicates d dimensions, and the value in each dimension is a real number.

w is model weight or model coefficient for a model in the disclosure. The dimensions of the model weight w correspond to the dimensions of the instance x. In other words, when the instance have d dimensions, the model weight w also has d dimensions. The model for example may be a linear model or any other types of models according the problem to be solved. $w_{\mathcal{G}_l}$ is the model weight on the l-th worker. $\hat{w}$ is the model weight that is inconsistently read from all the workers, any two different $\hat{w}$ from two different workers may be in different local iteration stages. $\hat{w}$ is related to the asynchronous training in this disclosure. $\tilde{w}$ represents a snapshot of model weight after a certain number of iterations. In certain embodiments, the d dimensions of the instance x and the d dimensions of the model weight w are in a form of vectors.

$w^T x$ is an exemplary linear model, which is the dot product between the model weight w and the instance x. $w^T x_i$, is the dot product between the model weight and the instance $x_i$ having the index i.

$L(w^T x_i, y_i)$ is a loss function for the linear model $w^T x$, and the loss function represents the difference between the dot product $w^T x_i$ and the label $y_i$ of the instance $x_i$.

$f(w)$ is the regularized empirical risk that can be defined by $$f(w) = \frac{1}{n}\sum_{i=1}^n \underbrace{L(w^T x_i, y_i) + g(w)}_{f_i(w)},$$

where g(w) is a regularization term, and $f_i(w)$ is the regularized loss function. In certain embodiments, $f(w)$ is also named the target of a training task.

$\nabla f_i(w)$ represents the stochastic gradient with respect to the instance $x_i$, $\nabla f_i(\tilde{w})$ represents the historical stochastic gradient with respect to the instance $x_i$, and $\nabla f(\tilde{w})$ represents the historical full gradient. $\nabla_{\mathcal{G}_l} f_i(\hat{w})$ is the stochastic gradient corresponding to the features on the l-th worker.

v represents unbiased stochastic gradient. $\tilde{v}_i^l = \nabla_{\mathcal{G}_l} f_i(\hat{w})$ in Algorithm 3, $\tilde{v}_i^l = \nabla_{\mathcal{G}_l} f_i(\hat{w}) - \nabla_{\mathcal{G}_l} f_i(w^s) + \nabla_{\mathcal{G}_l} f(w^s)$ in Algorithm 4, and $$\tilde{v}_i^l = \nabla_{\mathcal{G}_l} f_i(\hat{w}) - \hat{\alpha}_i^l + \frac{1}{n}\sum_{i=1}^n \hat{\alpha}_i^l$$

in Algorithm 5.

$\alpha_i$ is the latest historical gradient of $\nabla f_i(w)$. $\forall_i \in \{1, \ldots, n\}$ means for all i that belongs to 1 to n. q is a positive integer, and represents the number of workers. n is a positive integer, and represents the number of instances. γ is learning rate of the model. b is a random number in the range of [0, 2π], which could be generated by a random number generator. $b^l$ is the random number generated on the l-th worker. $T_0$, $T_1$, and $T_2$ are tree-structured communication schemes. Leaf (•), represents all leaves of a tree.

The privacy-preserving federated learning for vertically partitioned data has shown promising results as the solution of the emerging multi-party joint modeling application, in which the data holders (such as government branches, private finance and e-business companies) collaborate throughout the learning process rather than relying on a trusted third party to hold data. However, existing federated learning algorithms for vertically partitioned data are limited to synchronous computation.

In federated learning system, unbalanced computation/communication resources are common among the parties, and synchronous computations is often problematic. To improve the computation efficiency, in certain aspects, the present disclosure provides an asynchronous training algorithms for vertically partitioned data while keeping the data privacy. In certain embodiments, the provided algorithms, methods and systems include asynchronous federated SGD algorithm on vertically partitioned data (AFSGD-VP) and its SVRG and SAGA variants. Moreover, the present disclosure provides the convergence analyses of AFSGD-VP and its SVRG and SAGA variants under the condition of strong convexity. The disclosure also describes their model privacy, data privacy, computational complexities and communication costs. AFSGD-VP and its SVRG and SAGA variants are the first asynchronous federated learning algorithms for vertically partitioned data.

Figure 1B:
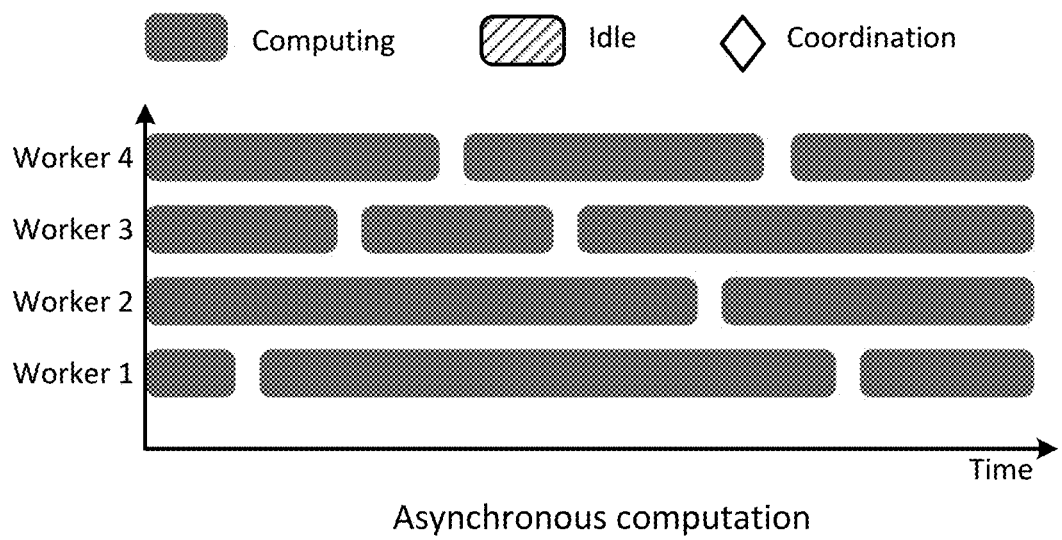
FIG. 1B schematically depicts asynchronous computation according to certain embodiments of the disclosure.

FIG. 1A and FIG. 1B schematically depicts the advantage of using asynchronous computation according to certain embodiments of the present disclosure. As shown in FIG. 1A, when synchronous computation is performed, coordination of the workers 1-4 is required at predefined time interval. At each time interval in the workers 1-4, the computation may include both computing time and idle time. In contrast, as shown in FIG. 1B, no coordination is required among the workers 1-4, and the computation in the workers 1-4 is continuous. When one of the workers 1-4 finishes one task, it will start the next task without idle time. Accordingly, the asynchronous computation shown in FIG.

1B is much more efficient than the synchronous computation shown in FIG. 1A, because the asynchronous computation keeps all computational resources busy all the time. In certain aspects, the disclosure uses SGD-like methods to train vertically partitioned data asynchronously, which is not disclosed by any others in the field.

The contributions according to certain aspects of the present disclosure includes, for example: (1) the disclosure provides an asynchronous federated stochastic gradient algorithm for vertically partitioned data (i.e., AFSGD-VP), and proves the convergence rate of AFSGD-VP under the condition of strong convexity; (2) the disclosure provides an asynchronous federated SVRG algorithm for vertically partitioned data (AFSVRG-VP), and proves the convergence rate of AFSVRG-VP under the condition of strong convexity; and (3) the disclosure provides an asynchronous federated SAGA algorithm for vertically partitioned data (AFSAGA-VP), and proves the convergence rate of AFSAGA-VP under the condition of strong convexity.

Problem Statement. The exemplary problem stated as follows is presented to illustrate the disclosure only and is not intended to limit the scope and forms of the disclosure. In certain embodiments, the disclosure considers the model in a linear form of $w^T x$, however, other model forms are possible based on the problem to be solved. Given a training set $S=\{(x_i, y_i)\}_{i=1}^n$, there will be $x_i \in \mathbb{R}^d$ and $y_i \in \{+1, -1\}$ for binary classification or $y_i \in \mathbb{R}$ for regression. The loss function with regard to the sample $(x_i, y_i)$ and the model weights $w$ can be formulated as $L(w^T x_i, y_i)$. Thus, the disclosure considers optimizing the following regularized empirical risk minimization problem:

$$\min_{w \in \mathbb{R}^d} f(w) = \frac{1}{n} \sum_{i=1}^n \underbrace{L(w^T x_i, y_i) + g(w)}_{f_i(w)}, \quad (1)$$

where $g(w)$ is a regularization term, and each $f_i: \mathbb{R}^d \to \mathbb{R}$ is considered as a smooth, possibly non-convex function in this disclosure. Obviously, the empirical risk minimization problem is a special case of the problem (1). In addition to the empirical risk minimization problem, problem (1) summarizes an extensive number of important regularized learning problems, such as $l_2$-regularized logistic regression, ridge regression and least-squares support-vector machine (LS-SVM). As mentioned previously, in a lot of real-world machine learning applications, the input of training sample $(x, y)$ is partitioned vertically into q parts, i.e., the disclosure has a partition $\{\mathcal{G}_1, \ldots, \mathcal{G}_q\}$ of d features. Thus, the disclosure has $x=[x_{\mathcal{G}_1}, x_{\mathcal{G}_2}, \ldots, x_{\mathcal{G}_l}, \ldots, x_{\mathcal{G}_q}]$, where $x_{\mathcal{G}_l} \in \mathbb{R}^{d_l}$ is stored on the l-th worker, and $\Sigma_{l=1}^q d_l = d$. According to whether the label is included in a worker, the disclosure divides the workers into two types: one is active worker and the other is passive worker, where the active worker is the data provider who holds the label of a sample, and the passive worker only has the input of a sample. The active worker would be a dominating server in federated learning, while passive workers play the role of clients. The disclosure lets $D^l$ denote the data stored on the l-th worker. Note that the labels $y_i$ are distributed on active workers. The goal of the disclosure can be presented as: make active workers to cooperate with passive workers to solve the regularized empirical risk minimization problem (1) on the vertically partitioned data $\{D^l\}_{l=1}^q$ in parallel and asynchronously with the SGD and its SVRG and SAGA variants, while keeping the vertically partitioned data private.

SGD, SVRG and SAGA. SGD-like algorithms have been popular algorithms for solving large-scale machine learning problems. The update framework of SGD-like algorithms include multiple variants of variance reduction methods. Specifically, given an unbiased stochastic gradient $v$ (i.e., $\mathbb{E} v = \nabla f(w)$), the updating rule of SGD-like algorithms can be formulated as:

$$w \leftarrow w - \gamma v \quad (2),$$

where $w$ is the model weight, $\gamma$ is the learning rate, and $v$ is the stochastic gradient. The following presents the specific forms to the unbiased stochastic gradient $v$ with regard to SGD, SVRG and SAGA.

SGD: at each iteration SGD (Bottou, 2010) independently samples a sample $(x_i, y_i)$, and uses the stochastic gradient $\nabla f_i(w)$ with respect to the sampled sample $(x_i, y_i)$ to update the solution as follows:

$$v = \nabla f_i(w) \quad (3),$$

where $\nabla f_i(w)$ is, the stochastic gradient of $f_i(w)$.

SVRG: for SVRG (Gu et. al., 2018; Xiao et al., 2014), instead of directly using the stochastic gradient $\nabla f_i(w)$, they use an unbiased stochastic gradient $v$ as follows to update the solution:

$$v = \nabla f_i(w) - \nabla f_i(\tilde{w}) + \nabla f(\tilde{w}) \quad (4),$$

where $\tilde{w}$ denotes snapshot of $w$ after a certain number of iterations.

SAGA: for SAGA (Defazio et. al., 2014), the unbiased stochastic gradient $v$ is formulated as follows:

$$v = \nabla f_i(w) - \alpha_i + \frac{1}{n} \sum_{i=1}^n \alpha_i, \quad (5)$$

where $\alpha_i$ is the latest historical gradient of $\nabla f_i(w)$, which can be updated in an online fashion. In certain embodiments, $\alpha_i$ is dynamic and will be updated during the training process of the model. In contract, the historical $\nabla f_i(\tilde{w})$ is a reference gradient, which is static.

Figure 2:
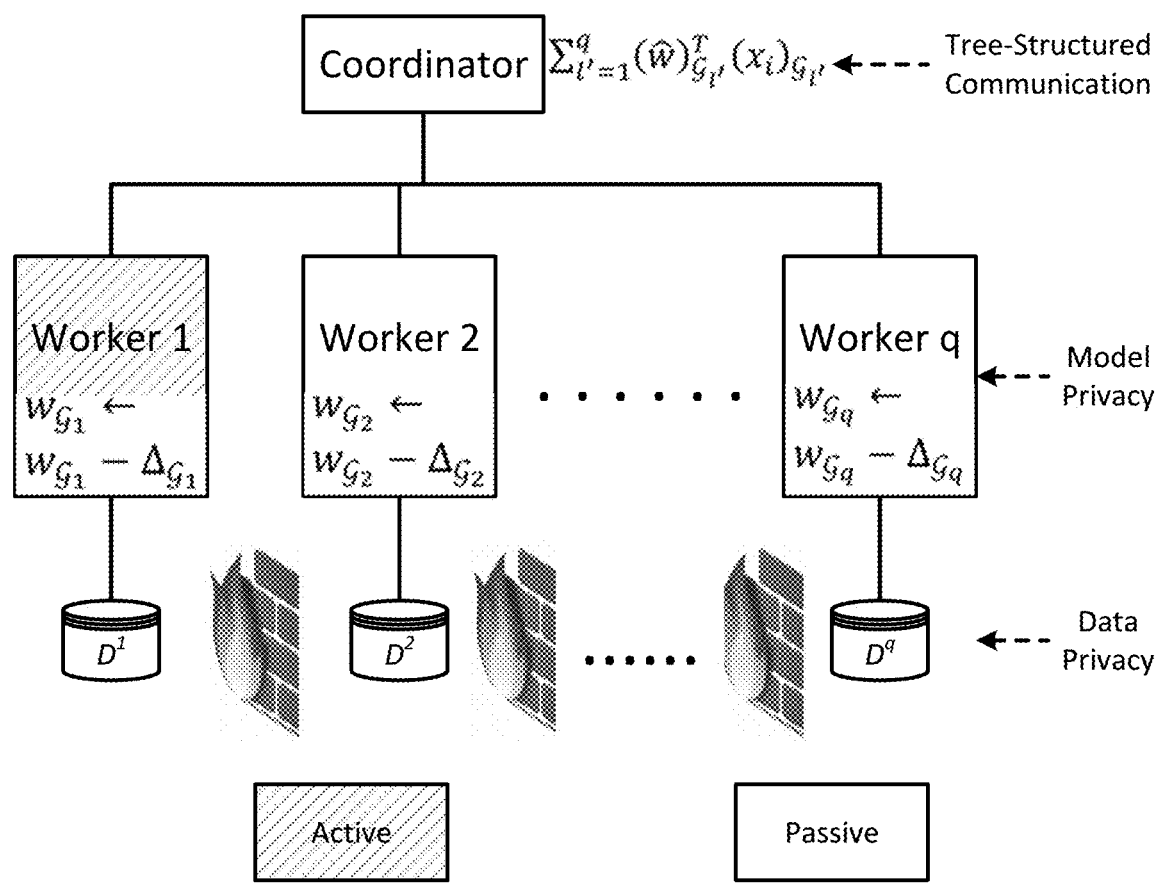
FIG. 2 schematically depicts a system of asynchronous federated learning for vertically partitioned data according to certain embodiments of the disclosure.

System Structure of the Disclosure. As mentioned above, AFSGD-VP, AFSVRG-VP and AFSAGA-VP are privacy-preserving asynchronous federated learning algorithms on the vertically partitioned data. FIG. 2 schematically depicts a privacy-preserving asynchronous federated learning system according to certain embodiments of the present disclosure. As shown in FIG. 2, the system utilizes tree-structured communication, and achieves model privacy and data privacy.

Figure 3A:
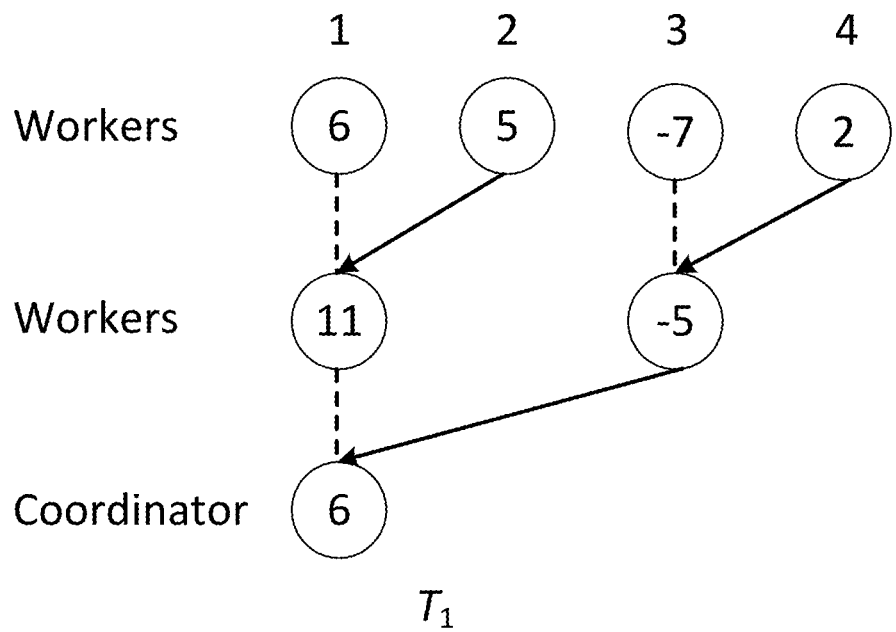
FIG. 3A schematically depicts a tree structure according to certain embodiments of the disclosure.
Figure 3B:
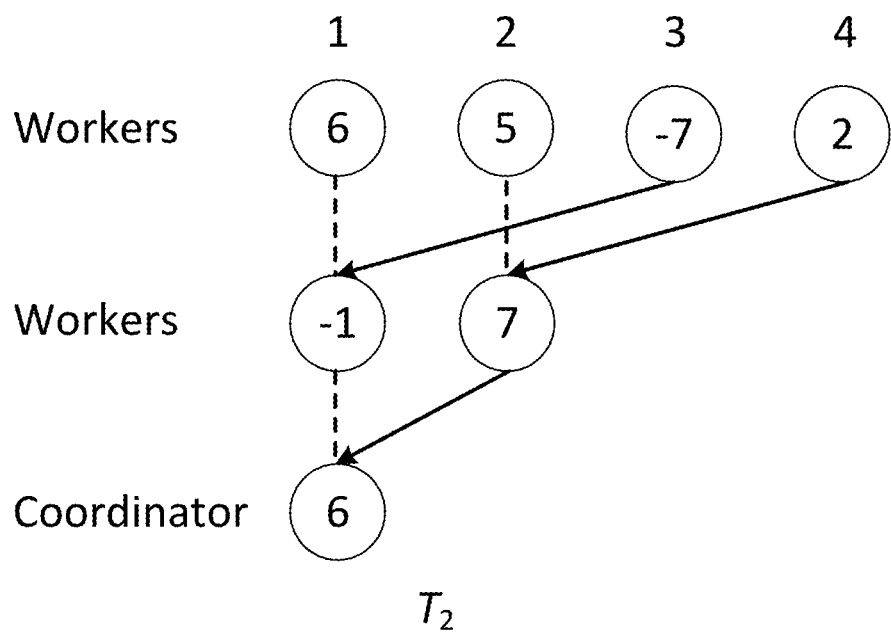
FIG. 3B schematically depicts another tree structure according to certain embodiments of the disclosure.

Tree-Structured Communication. To obtain $w^T x_i$, the disclosure needs to accumulate the local results from different workers. Zhang et. al., 2018 proposed an efficient tree-structured communication scheme to get the global sum which is faster than the simple strategy of sending the results from all workers directly to the coordinator for sum. FIG. 3A and FIG. 3B schematically depict two different tree-structured communication according to certain embodiments of the present disclosure. Take 4 workers as an example, as shown in FIG. 3A, the disclosure pairs the workers so that while worker 1 adds the result from worker 2, worker 3 can add the result from worker 4 simultaneously. Finally, the results from the two pairs of workers are sent to the coordinator and the disclosure obtains the global sum. In certain embodiments, the disclosure uses the tree-structured communication scheme to obtain $w^T x_i$. Note that, the tree-structured communication scheme works with the asynchronous pattern to obtain $w^T x_i$. Therefore, the disclosure does not align the iteration numbers of $w_{G_l}$ from different workers to compute $w^T x_i$. It is significantly different from the synchronous pattern used in Zhang where all $w_{G_l}$ have one and the same iteration number.

Based on the tree-structured communication scheme, the basic algorithm of computing $\Sigma_{l'=1}^{q} w_{G_{l'}}^T (x_i)_{G_{l'}}$ on the l-th active worker in the following Algorithm 1. In certain embodiments, after the model is well trained, Algorithm 1 can be used to make a prediction on the l-th active worker for a new instance $x_i$. In certain embodiments, as shown in Algorithm 1, each worker has certain features or certain dimensions of the instances, and correspondingly has certain dimensions of the model weight corresponding to the features or dimensions of the instance stored in that worker. In certain embodiments, the tree-structure communication in Algorithm 1 can use any tree structure form.

---

Algorithm 1

Basic algorithm of computing $\Sigma_{l'=1}^{q} w_{G_{l'}}^T (x_i)_{G_{l'}}$ on the l-th active worker Input: w, $x_i$
  {This loop asks multiple workers running in parallel.}
  1: for l' = 1, ... , q do
  2:   Calculate $w_{G_{l'}}^T (x_i)_{G_{l'}}$ .
  3: end for
  4: Use tree-structure communication scheme to compute $\xi = \Sigma_{l'=1}^{q} w_{G_{l'}}^T (x_i)_{G_{l'}}$ .
Output: $\xi$.

---

Data and Model Privacy. To keep the vertically partitioned data and model privacy, the disclosure saves the data $(x_i)_{G_l}$ and model weights $w_{G_l}$ in the l-th worker separately and privately. The disclosure does not directly transfer the local data $(x_i)_{G_l}$ and the local model weights $w_{G_l}$ to other workers. To obtain $w^T x_i$, the disclosure locally computes $(w)_{G_l}^T (x_i)_{G_l}$ and only transfers $(w)_{G_l}^T (x_i)_{G_l}$ to other workers for computing $w^T x$ as shown in Algorithm 1. It is not trivial to infer the local model coefficients $w_{G_l}$ and the local instance $(x_i)_{G_l}$ based on the value of $(w)_{G_l}^T (x_i)_{G_l}$. Thus, the disclosure achieves the data and model privacy.

Although it is not trivial to exactly infer the local model coefficients $w_{G_l}$ and the local instance $(x_i)_{G_l}$ based on the value of $(w)_{G_l}^T (x_i)_{G_l}$ it has the risk of approximate inference attack. The risk is high when the number of dimensions of the instance and the model weight is small. To address this issue, the disclosure applies a safer algorithm to compute $\Sigma_{l'=1}^{q} w_{G_{l'}}^T (x_i)_{G_{l'}}$ in Algorithm 2. Specifically, the disclosure adds a random number $b^{l'}$ into the dot product $w_{G_{l'}}^T (x_i)_{G_{l'}}$ to obtain the adjusted dot product, and then uses the tree-structured communication scheme on a tree structure $T_1$ to compute the summation of the adjusted dot products $\Sigma_{l'=1}^{q} (w_{G_{l'}}^T (x_i)_{G_{l'}} + b^{l'})$ which can improve the data and model security for the operation of transferring the value of $w_{G_{l'}}^T (x_i)_{G_{l'}} + b^{l'}$. Finally, the disclosure needs to recover the value of $\Sigma_{l'=1}^{q} w_{G_{l'}}^T (x_i)_{G_{l'}}$ from $\Sigma_{l'=1}^{q} (w_{G_{l'}}^T (x_i)_{G_{l'}} + b^{l'})$. In order to prevent leaking any sum of $b^{l'}$ of a subtree of $T_1$, the disclosure uses a significantly different tree structure $T_2$ on all workers to compute $\bar{b} = \Sigma_{l'=1}^{q} b^{l'}$. The using of two significantly different tree structures for communicating the adjusted dot products and the random numbers enhances data security. In certain embodiments, the two tree structures $T_1$ and $T_2$ may or may not be the ones shown in FIG. 3A and FIG. 3B, as long as the two tree structures are significantly different from each other.

In certain embodiments, the significantly difference is defined as that the tree structures $T_1$ and $T_2$ don't have a subtree that is in common. Specifically, for two tree structures $T_1$ and $T_2$ on all workers $\{1, \ldots, q\}$, they are significantly different if there does not exist a subtree $\hat{T}_1$ of $T_1$ and a subtree $\hat{T}_2$ of $T_2$ whose sizes are larger than 1 and smaller than $T_1$ and $T_2$, respectively, such that Leaf($\hat{T}_1$) = Leaf($\hat{T}_2$).

---

Algorithm 2

Safer algorithm of computing $\Sigma_{l'=1}^{q} w_{G_{l'}}^T (x_i)_{G_{l'}}$ on the l-th active worker Input: w, $x_i$
  {This loop asks multiple workers running in parallel.}
  1: for l' = 1, ... , q do
  2:   Generate a random number $b^{l'}$ .
  3:   Calculate $w_{G_{l'}}^T (x_i)_{G_{l'}} + b^{l'}$ .
  4: end for
  5: Use tree-structure communication scheme based on the tree structure $T_1$ on all workers $\{1, ..., q\}$ to compute $\xi = \Sigma_{l'=1}^{q} (w_{G_{l'}}^T (x_i)_{G_{l'}} + b^{l'})$.
  6: Use tree-structure communication scheme based on the totally different tree structure $T_2$ on all workers $\{1, ..., q\}$ to compute $\bar{b} = \Sigma_{l'=1}^{q} b^{l'}$ .
Output: $\xi - \bar{b}$.

---

In certain embodiments, during training, either Algorithm 1 or Algorithm 2 may be called by the following Algorithms 3-5. After the model is well trained, both Algorithm 1 and Algorithm 2 can be used to make a prediction on the l-th active worker for a new instance $x_i$. Kindly note Algorithm 1 generally has sufficient data privacy, especially when the number of dimensions of the instances are large. When the number of dimensions of the instances are small, such as less than five dimensions, or only 1 or two dimensions, Algorithm 2 is preferred for prediction in order to keep high security of the model.

Algorithms and Method of Applying the Algorithms. In certain embodiments, the disclosure provides three asynchronous federated stochastic gradient algorithms AFSGD-VP, AFSVRG-VP and AFSAGA-VP and applies them on processing federated data. In certain embodiments, AFSVRG-VP is a preferred algorithm.

AFSGD-VP. AFSGD-VP repeats the following four steps concurrently for each worker without any lock. (1) Pick up an index: AFSGD-VP picks up an index i randomly from $\{1, \ldots, n\}$ and obtains the local instance $(x_i)_{G_l}$ from the local data $D^l$. (2) Compute $\hat{w}^T x_i$: AFSGD-VP uses the tree-structured communication scheme with asynchronous pattern (i.e., Algorithm 1 or 2) to obtain $\hat{w}^T x_i = \Sigma_{l'=1}^{q} (\hat{w})_{G_{l'}}^T (x_i)_{G_{l'}}$, where $\hat{w}$ denotes w inconsistently read from different workers and two $(\hat{w})_{G_{l'}}$ from different workers may be in different local iteration stages. Note that the disclosure always has that current $(w)_{G_l} = (\hat{w})_{G_l}$ (3) Compute stochastic local gradient: Based on $\hat{w}^T x_i$, the disclosure can compute the unbiased stochastic local gradient $\hat{v}_i^l = \nabla_{G_l} f_i(\hat{w})$. (4) Update: AFSGD-VP updates the local model weights $w_{G_l}$ by $w_{G_l} \leftarrow w_{G_l} - \gamma \cdot \hat{v}_i^l$, where $\gamma$ is the learning rate. The application of the AFSGD-VP algorithm is summarized in the following Algorithm 3.

Algorithm 3
Asynchronous federated SGD algorithm (AFSGD-VP)
for vertically partitioned data on the l-th active worker Input: Local data $D^l$, learning rate $\gamma$.
1: Initialize $w_{\mathcal{G}_l} \in \mathbb{R}^{d_l}$.
2: Keep doing in parallel
3:    Pick up an index $i$ randomly from $\{1, \ldots, n\}$ and obtain the local instance $(x_i)_{\mathcal{G}_l}$ from the local data $D^l$.
4:    Compute $(w)_{\mathcal{G}_l}^T (x_i)_{\mathcal{G}_l}$.
5:    Compute $\hat{w}^T x_i = \Sigma_{l'=1}^q (\hat{w})_{\mathcal{G}_{l'}}^T (x_i)_{\mathcal{G}_{l'}}$ based on Algorithm 1 or 2.
6:    Compute $\hat{v}_i^l = \nabla_{\mathcal{G}_l} f_i(\hat{w})$.
7:    Update $w_{\mathcal{G}_l} \leftarrow w_{\mathcal{G}_l} - \gamma \cdot \hat{v}_i^l$.
8: End Parallel loop
Output: $w_{\mathcal{G}_l}$ AFSVRG-VP. Stochastic gradients in AFSGD-VP have a large variance due to the random sampling similar to SGD algorithm. To handle the large variance, AFSVRG-VP of the disclosure uses the SVRG technique to reduce the variance of the stochastic gradient, and propose a faster AFSGD-VP algorithm (i.e., AFSVRG-VP). The AFSVRG-VP algorithm according to certain embodiments of the present disclosure is summarized in Algorithm 4. Compared to AFSGD-VP, AFSVRG-VP has the following three differences: (1) The first one is that AFSVRG-VP is to compute the full local gradient $$\nabla_{\mathcal{G}_l} f(w^s) = \frac{1}{n} \sum_{i=1}^n \nabla_{\mathcal{G}_l} f_i(w^s)$$

in the outer loop which will be used as the snapshot of full gradient, where the superscript s denotes the s-th out loop. (2) The second one is that the disclosure computes not only $\hat{w}^T x_i$, but also $(w^s)^T x_i$ for each iteration. (3) The third one is that AFSVRG-VP computes the unbiased stochastic local gradient as $\hat{v}_i^l = \nabla_{\mathcal{G}_l} f_i(\hat{w}) - \nabla_{\mathcal{G}_l} f_i(w^s) + \nabla_{\mathcal{G}_l} f(w^s)$, instead of $\hat{v}_i^l = \nabla_{\mathcal{G}_l} f_i(\hat{w})$.

Algorithm 4 Asynchronous federated SVRG algorithm (AFSVRG-VP)
for vertically partitioned data on the l-th active worker Input: Local data $D^l$, learning rate $\gamma$.
1: Initialize $w_{\mathcal{G}_l}^0 \in \mathbb{R}^{d_l}$.
2: for $s = 0, 1, 2, \ldots, S-1$ do
3:    Compute the full local gradient $\nabla_{\mathcal{G}_l} f(w^s) = \frac{1}{n} \sum_{i=1}^n \nabla_{\mathcal{G}_l} f_i(w^s)$
   by using tree-structured communication scheme.
4:    $w_{\mathcal{G}_l} = w_{\mathcal{G}_l}^s$.
5:    Keep doing in parallel
6:      Pick up a local instance $(x_i)_{\mathcal{G}_l}$ randomly from the local data $D^l$.
7:      Compute $(w)_{\mathcal{G}_l}^T (x_i)_{\mathcal{G}_l}$ and $(w^s)_{\mathcal{G}_l}^T (x_i)_{\mathcal{G}_l}$.
8:      Compute $\hat{w}^T x_i = \Sigma_{l'=1}^q (\hat{w})_{\mathcal{G}_{l'}}^T (x_i)_{\mathcal{G}_{l'}}$ and $(w^s)^T x_i = \Sigma_{l'=1}^{q(w^s)} (\hat{w})_{\mathcal{G}_{l'}}^T (x_i)_{\mathcal{G}_{l'}}$ based on Algorithm 1 or 2.
9:      Compute $\hat{v}_i^l = \nabla_{\mathcal{G}_l} f_i(\hat{w}) - \nabla_{\mathcal{G}_l} f_i(w^s) + \nabla_{\mathcal{G}_l} f(w^s)$
10:     Update $w_{\mathcal{G}_l} \leftarrow w_{\mathcal{G}_l} - \gamma \cdot \hat{v}_i^l$.
11:    End parallel loop
12:    $w_{\mathcal{G}_l}^{s+1} = w_{\mathcal{G}_l}$.
13: end for
Output: $w_{\mathcal{G}_l}$ AFSAGA-VP. As mentioned above, the stochastic gradients in SGD have a large variance due to the random sampling. To handle the large variance, AFSAGA-VP of the disclosure uses the SAGA technique to reduce the variance of the stochastic gradients. The disclosure summarizes the AFSAGA-VP algorithm in Algorithm 5. Specifically, the disclosure maintains a table of latest historical local gradients $\alpha_i^l$ which are achieved by the updating rule of $\hat{\alpha}_i^l \leftarrow \nabla_{\mathcal{G}_l} f_i(w)$ for each iteration. Based on the table of the latest historical local gradients $\hat{\alpha}_i^l$, the unbiased stochastic local gradient in AFSAGA-VP is computed as $$\hat{v}_i^l = \nabla_{\mathcal{G}_l} f_i(\hat{w}) - \hat{\alpha}_i^l + \frac{1}{n} \sum_{i=1}^n \hat{\alpha}_i^l.$$

Algorithm 5 Asynchronous federated SAGA algorithm (AFSAGA-VP)
for vertically partitioned data on the l-th active worker Input: Local data $D^l$, learning rate $\gamma$.
1: Initialize $w_{\mathcal{G}_l} \in \mathbb{R}^{d_l}$.
2: Compute the local gradient $\hat{\alpha}_i^l = \nabla_{\mathcal{G}_l} f_i(w)$, $\forall_i \in \{1, \ldots, n\}$ by using tree-structured communication scheme, and locally save them.
3: Keep doing in parallel
4:    Pick up a local instance $(x_i)_{\mathcal{G}_l}$ randomly from the local data $D^l$.
5:    Compute $(w)_{\mathcal{G}_l}^T (x_i)_{\mathcal{G}_l}$
6:    Compute $\hat{w}^T x_i = \Sigma_{l'=1}^q (\hat{w})_{\mathcal{G}_{l'}}^T (x_i)_{\mathcal{G}_{l'}}$ based on Algorithm 1 or 2.
7:    Compute $\hat{v}_i^l = \nabla_{\mathcal{G}_l} f_i(\hat{w}) - \hat{\alpha}_i^l + \frac{1}{n} \sum_{i=1}^n \hat{\alpha}_i^l.$
8:    Update $w_{\mathcal{G}_l} \leftarrow w_{\mathcal{G}_l} - \gamma \cdot \hat{v}_i^l$.
9:    Update $\hat{\alpha}_i^l \leftarrow \nabla_{\mathcal{G}_l} f_i(\hat{w})$.
10: End parallel loop
Output: $w_{\mathcal{G}_l}$.

Theoretical Analysis. The disclosure provides convergence, security analysis and complexity analyses to AFSGD-VP, AFSVRG-VP and AF SAGA-VP.

Convergence analysis. The disclosure first gives the assumptions of strong convexity, (block-coordinate) Lipschitz smoothness and block-coordinate bounded gradients, which are standard for convex analysis. Then, for AFSGD-VP, the disclosure proves that the convergence rate is $$O\left(\frac{1}{\sqrt{\epsilon}} \log\left(\frac{1}{\epsilon}\right)\right)$$

to reach the accuracy $\epsilon$. For AFSVRG-VP and AFSAGA-VP, the disclosure proves that the convergence rates are $$O\left(\log\left(\frac{1}{\epsilon}\right)\right).$$

Security analysis. The disclosure proves that the AFSGD-VP, AFSVRG-VP and AFSAGA-VP algorithms can prevent the exact inference attack (see Definition 1) and approximate inference attack (see Definition 2) under the semi-honest assumption.

Definition 1 (Exact inference attack). An exact inference attack on the l-th worker is to exactly infer some feature group $\mathcal{G}$ of one sample x or model w which belongs from other workers without directly accessing it.

Definition 2 ($\epsilon$-approximate inference attack). An $\epsilon$-approximate inference attack on the l-th worker is to infer some feature group $\mathcal{G}$ of one sample x (model w) as $\hat{x}_\mathcal{G}(\hat{w}_\mathcal{G})$ with the accuracy of $\epsilon$ (i.e., $\|\hat{x}_\mathcal{G} - x_\mathcal{G}\|_\infty \leq \epsilon$ or $\|\hat{w}_\mathcal{G} - w_\mathcal{G}\|_\infty \leq \epsilon$) which belongs from other workers without directly accessing it.

Semi-honest assumption (semi-honest security). All workers will follow the algorithm to perform the correct computations. However, they may retain records of the intermediate computation results which they may use later to infer the other work's data and model.

Complexity analysis. The disclosure gives the computational complexities and communication costs of AFSGD-VP, AFSVRG-VP and AFSAGA-VP as follows.

The computational complexity for one iteration of AFSGD-VP is $O(d+q)$. Thus, the total computational complexity of AFSGD-VP is $O((d+q)t)$, where t denotes the iteration number. Further, the communication cost for one iteration of AFSGD-VP is $O(q)$, and the total communication cost is $O(qt)$.

For AFSVRG-VP, the computational complexity and communication cost of line 3 in Algorithm 4 are $O((d+q)l)$ and $O(ql)$, respectively. Assume that the inner loop number of AFSVRG-VP is t. Thus, the total computational complexity of AFSVRG-VP is $O((d+q)(1+t)S)$, and the communication cost is $O(q(1+t)S)$.

For AFSAGA-VP, the computational complexity and communication cost of line 2 in Algorithm 5 are $O((d+q)l)$ and $O(ql)$, respectively. Assuming that the loop number of AFSAGA-VP is t, the total computational complexity of AFSAGA-VP is $O((d+q)(1+t))$, and the communication cost is $O(q(1+t))$.

IMPLEMENTATIONS AND EXAMPLES OF THE DISCLOSURE

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 4A:
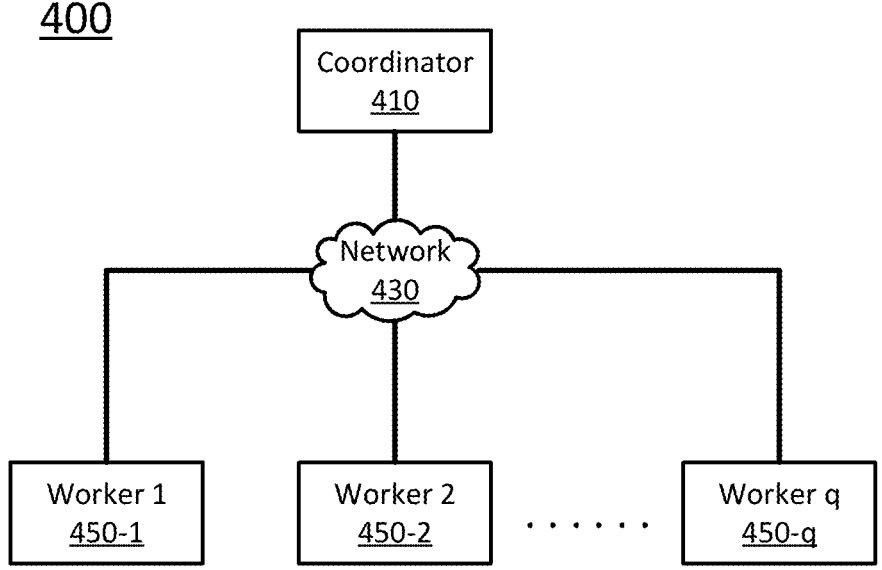
FIG. 4A schematically depicts a system for asynchronous federated learning according to certain embodiments of the present disclosure.

FIG. 4A schematically depicts a system for federated learning according to certain embodiments of the present disclosure. As shown in FIG. 4A, the system 400 includes a coordinator 410, a network 430, and multiple workers 450. The coordinator 410 and the multiple workers 450 are in communication with each other through the network 430. In certain embodiments, each of the coordinator 410 and the workers 450 shown in FIG. 4A may be a server computer, a cluster, a cloud computer, a general-purpose computer, a headless computer, or a specialized computer, which provides federated learning capacity. In certain embodiments, each of the coordinator 410 and the workers 450 is the server computing device. In certain embodiments, the coordinator 410 is configured to, upon receiving a request from an active worker 450, collect certain data from the active and passive workers 450. The data to be collected by the coordinator 410 may include, for example, dot products between model weight w and an instance in each of the workers. In certain embodiments, the coordinator 410 is configured to use one of a variety of tree-structured communication to collect the data from the workers 450. In certain embodiments, some or all of the workers 450 include a model for federated learning, and each worker 450 may have its own private data. The workers 450 can be an active worker or a passive worker. When a worker 450 initiates a federated learning, it functions as an active worker. The active worker 450 may request the coordinator 410 to collect certain data from the workers, or notify the other workers to perform certain function. The other workers are named passive workers. The active and passive workers 450 may work together to train the federated learning model, but the private data are protected in the corresponding workers and not shared with other workers, and each worker may have its own model weight. In certain embodiments, the federated learning model is an Asynchronous Federated Learning (AF) model, and the private data are vertically partitioned data. The network 430 may be a wired or wireless network, and may be of various forms, such as a public network and a private network. Examples of the network 430 may include, but not limited to, a local area network (LAN) or wide area network (WAN) including the Internet. In certain embodiments, two or more different networks 430 may be applied to connect the coordinator 410 and the workers 450.

Figure 4B:
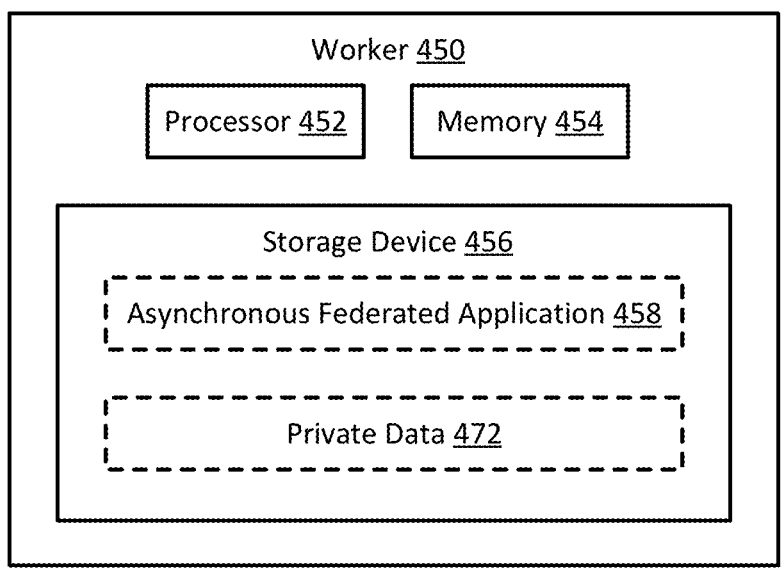
FIG. 4B schematically depicts a worker for asynchronous federated learning according to certain embodiments of the present disclosure.

FIG. 4B schematically depicts a worker 450 according to certain embodiments of the present disclosure. In certain embodiments, the worker 450 is the server computing device and functions as an active worker. However, the worker 450 may be any of the workers 450-1 to 450-$q$, because each of the workers can initialize an AF training and operate as an active worker, and each of the workers can operate as a passive worker and receive instruction from the active worker. As shown in FIG. 4B, the worker 450 may include, without being limited to, a processor 452, a memory 454, and a storage device 456. In certain embodiments, the worker 450 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 452 may be a central processing unit (CPU) which is configured to control operation of the worker 450. The processor 452 can execute an operating system (OS) or other applications of the worker 450. In certain embodiments, the worker 450 may have more than one CPU as the processor, such as two CPUs, four CPUs, eight CPUs, or any suitable number of CPUs.

The memory 454 can be a volatile memory, such as the random-access memory (RAM), for storing the data and information during the operation of the worker 450. In certain embodiments, the memory 454 may be a volatile memory array. In certain embodiments, the worker 450 may run on more than one memory 454. In certain embodiments, the worker 450 may further include graphic card to assist the processor 452 and the memory 454 with image processing and display.

The storage device 456 is a non-volatile data storage media for storing the OS (not shown) and other applications of the worker 450. Examples of the storage device 456 may include non-volatile memory such as flash memory, memory cards, USB drives, hard drives, floppy disks, optical drives, solid-state drive, or any other types of data storage devices. In certain embodiments, the worker 450 may have multiple storage devices 456, which may be identical storage devices or different types of storage devices, and the applications of the worker 450 may be stored in one or more of the storage devices 456 of the worker 450.

In this embodiments, the processor 452, the memory 454, and the storage device 456 are component of the worker 450, such as a server computing device. In other embodiments, the worker 450 may be a distributed computing device and the processor 452, the memory 454, and the storage device 456 are shared resources from multiple computing devices in a pre-defined area.

The storage device 456 includes, among other things, an asynchronous federated (AF) application 458 and private data 472. The AF application 458, when being executed, is configured to train an AF model or make a prediction using the AF model. In certain embodiments, the AF model is a linear model. In certain embodiments, the AF application 458 can be any of the AFSGD application 558A shown in FIG. 5A, the AFSVRG application 558B shown in FIG. 5B, and the AFSAGA application 558C shown in FIG. 5C. In certain embodiments, each of the applications 558A, 558B and 558C is named a model, which includes model weights that can be trained using training data, and the model can be used to make predictions using the trained model weights. The private data 472 is specific for each worker, but different workers may have the same index for one instance. For example, an instance $x_i$ may have 100 dimensions of features, and the index of the instance $x_i$ is i. The instance $x_i$ may be stored in three different workers 450, each of the stored instance have the same index. The first worker may store the first 20 dimensions of the instance, the second worker may store the other 70 dimensions of the instance, and the third worker may store the rest of 10 dimensions of the instance. The total of 100 dimensions of the instance $x_i$ can then be linked through the same index i. Each dimension of the instance may correspond to a feature of the instance, and each feature may be represented by a vector in the corresponding dimension.

Figure 5A:
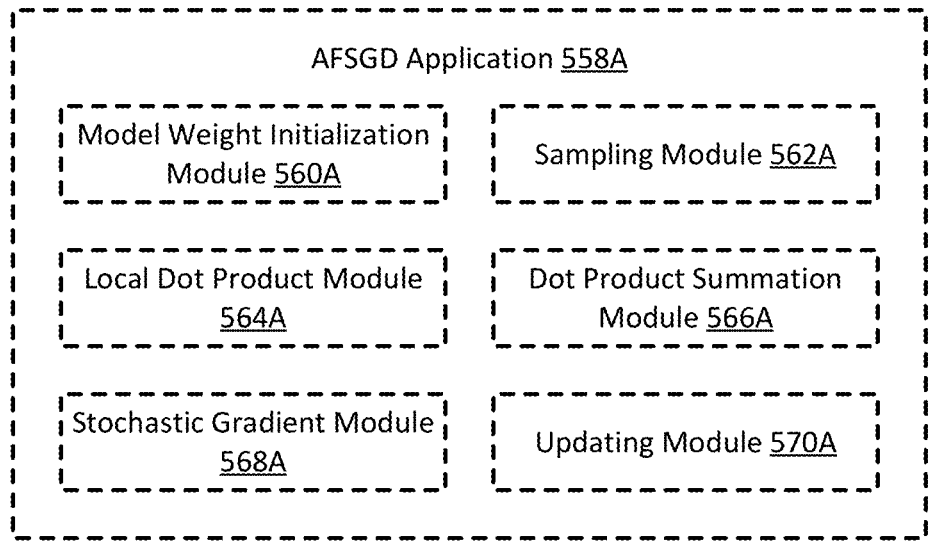
FIG. 5A schematically depicts an AFSGD application for asynchronous federated learning according to certain embodiments of the present disclosure.

FIG. 5A schematically depicts the AFSGD application 558A according to certain embodiments of the present disclosure. As shown in FIG. 5A, the AFSGD application 558A includes a model weight initialization module 560A, a sampling module 562A, a local dot product module 564A, a dot product summation module 566A, a stochastic gradient module 568A, and an updating module 570A. In certain embodiments, the AFSGD application 558A may include other applications or modules necessary for the operation of the AFSGD application 558A, such as a listener configured to receive a notice or an instruction from the coordinator 410 or other workers 450. It should be noted that the modules 560A-570A are each implemented by computer executable codes or instructions, or data table or databases, or a combination of hardware and software, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named a model, which can be trained using training data, and after well trained, can be used to make a prediction. In certain embodiments, the function of the AFSGFD application 558A corresponds to Algorithm 3 described above.

The model weight initialization module 560A is configured to initialize model weight $w_{G_l}$ of the AFSGD application 558A (or the AFSGD model, which could be a linear model), and to provide the initialized model weight to the local dot product module 564A. In certain embodiments, the dimensions of the model weight w is the same as the dimension of the instance x. In certain embodiments, each dimension of the model weight w is a real number. During initialization, the model weight initialization module 560A may provide each dimension of the model weight with a random value, the value 0, or any other arbitrary values. During training using the training samples (instances and their corresponding labels), the model weight can be updated and stored in the AFSGD application 558A. During prediction, the most recent model weight can be used to make a prediction based on an instance. In certain embodiments, during or after initialization, the AFSGD model of the active worker is further configured to instruct the passive workers to initialize their respective model weights and run their respective training. In certain embodiments, the model weight initialization module 560A is further configured to instruct the sampling module 562A to start sampling an instance.

The sampling module 562A is configured to, upon receiving the instruction from the model weight initialization module 560A, pick up an index i randomly from $\{1, \ldots, n\}$, obtain the local instance $(x_i)_{G_l}$ from the local data $D^l$, and send the local instance to the local dot product module 564A. Here n is the number of instances in the training data that are used for training the AFSGD application 558A, i is the index of the instances, and each sample includes the instance $(x_i)_{G_l}$ and its corresponding label $y_i$. The label $y_i$ is available to other modules, such as the stochastic gradient module 568A for obtaining the stochastic gradient.

The local dot product module 564A is configured to, upon receiving the initialized model weight $w_{G_l}$ from the model weight initialization module 560A and the local instance $(x_i)_{G_l}$ from the sampling module 562A, calculate the local dot product $(w)_{G_l}^T(x_i)_{G_l}$ between the initialized model weight and the local instance, and send the local dot product to the dot product summation module 566A. In certain embodiment, the AFSGD application 558 would have an updated model weight after one round of training. The later round of training, such as the training using the second randomly picked local instance or the later instances, would use the updated model weight instead of the initialized weight.

The dot product summation module 566A is configured to, upon receiving the local dot product, request the coordinator 410 to compute the summation of the dot product $\hat{w}^T x_i$ corresponding to the instance $x_i$. In response to the request, the coordinator 410 is configured to use a tree-structured communication to summate the dot products from all the workers to obtain the summated dot product corresponding to the instance $x_i$, and provide the summated dot product to the stochastic gradient module 568A. The tree structure can be in the form of $T_1$, $T_2$ or any other types. In certain embodiments, the dot product from each worker is calculated using the most recent model weight in that worker.

The stochastic gradient module 568A is configured to, upon receiving the summated dot product $\hat{w}^T x_i$, compute the stochastic gradient $\hat{v}^j$ from the summated dot product, and send the stochastic gradient to the updating module 570A. In certain embodiments, the computation of the stochastic gradient $\hat{v}^j$ may be based on the equations (1) and (3).

The updating module 570A is configured to, upon receiving the stochastic gradient $\hat{v}^j$ from the stochastic module 568A, update the model weight using the stochastic gradient and the learning rate $\gamma$. In certain embodiments, the learning rate is a constant learning rate. In certain embodiments, the updating module 570 may further instructs the sampling module 562A to pick up another sample, and use the sample to further refine the updated model weight. After the training process is iterated using all the training instances, the updating module 570A is configured to present the current model weight as the output of the model. The well trained model with the updated model weight can then be used for prediction.

In certain embodiments, the AFSGD application 558A may further include a user interface and/or a scheduler. The user interface may be used for configuring parameters of the AFSGD application 558A, for training of the AFSGD application 558A, and for making predictions using the AFSGD application 558A. The scheduler may be used to schedule the operations and the data flow between the modules of the AFSGD application 558A, between the active worker and the coordinator, and between the active worker and the other workers.

Figure 5B:
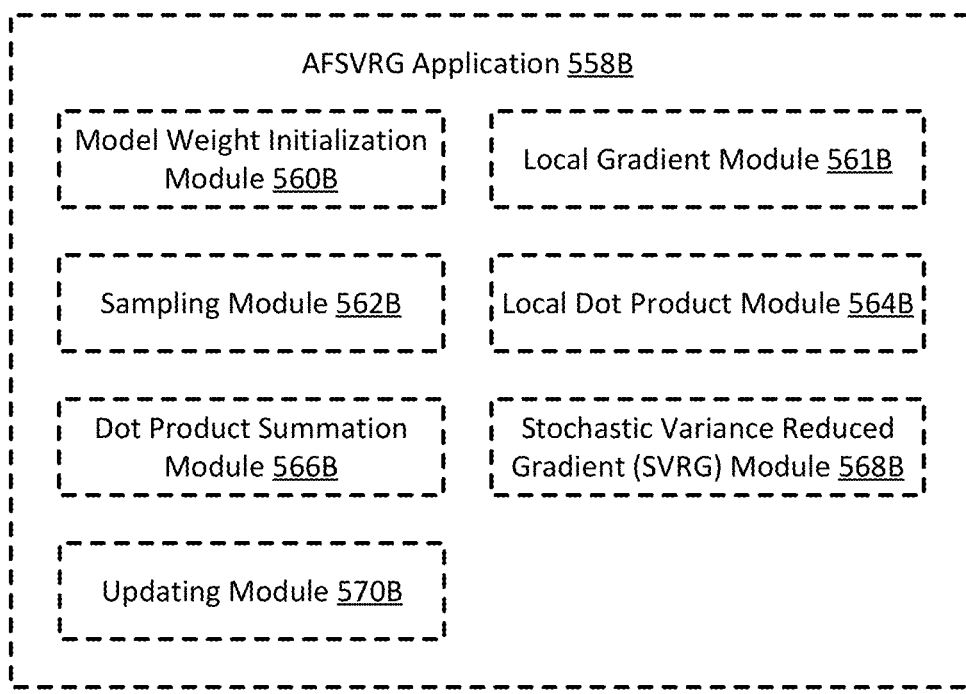
FIG. 5B schematically depicts an AFSVRG application for asynchronous federated learning according to certain embodiments of the present disclosure.

FIG. 5B schematically depicts the AFSVRG application 558B according to certain embodiments of the present disclosure. As shown in FIG. 5B, the AFSVRG application 558B includes a model weight initialization module 560B, a local gradient module 561B, a sampling module 562B, a local dot product module 564B, a dot product summation module 566B, a stochastic gradient module 568B, and an updating module 570B. In certain embodiments, the AFSVRG application 558B may include other applications or modules necessary for the operation of the AFSVRG application 558B, such as a listener configured to receive a notice or an instruction from the coordinator 410 or other workers 450. It should be noted that the modules 560B-570B are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named a model or the AFSVRG model, which can be trained using training data, and after well trained, can be used to make a prediction. In certain embodiments, the function of the AFSVRG application 558B corresponds to Algorithm 4 described above. In certain embodiments, the AFSAGA application 558C is defined with a learning rate $\gamma$, and is provided with private data 472.

The model weight initialization module 560B is configured to initialize weights of the AFSVRG application 558B, and to provide the initialized model weight $w_{G_l}^0$ to the local gradient module 561B. In certain embodiments, the dimensions of the model weight is the same as the dimension of the local instance. In certain embodiments, each dimension of the model weight is a real number. During initialization, the model weight initialization module 560B may provide each dimension of the model weight with a random value, the value 0, or any other arbitrary values. The superscript of the model weight indicates an outer loop, which iterates from 0 to S−1, where S is a predefined positive integer. The subscript of the model weight indicates an inner loop, which has n iterations corresponding to the n number of training instances. During training using the training samples (instances and their corresponding labels), the model weight can be updated and stored in the AFSVRG application 558B. During prediction, the most recent model weight can be used to make a prediction based on an instance. In certain embodiments, during or after initialization, the AFSVRG model of the active worker is further configured to instruct the passive workers to initialize their respective model weights and run their respective training. In certain embodiments, the model weight initialization module 560B is further configured to instruct the sampling module 562B to start sampling an instance.

The local gradient module 561B is configured to, for an iteration s from 0 to S−1, compute the full local gradient, and send the full local gradient to the stochastic variance reduced gradient (SVRG) module 568B. In certain embodiments, S is a predefined positive integer, and the value of S is configured according to the form of the model, the problem to be solved, and the size of the training data. In certain embodiments, S is configured such that the training of the model is convergent. In certain embodiments, S can be set at 100 or 1000 empirically. In certain embodiments, the local gradient module 561B is configured to instruct the coordinator 410 to compute the full local gradient using the equation $$\nabla_{G_l} f(w^s) = \frac{1}{l} \sum_{i=1}^{l} \nabla_{G_l} f_i(w^s),$$

and the coordinator 410 is configured to perform the summation using a tree-structured communication scheme. In certain embodiments, the local gradient module 561B is further configured to define reference model weight (or most recent historical model weight) $w_{G_l}^s$ as the current model weight $w_{G_l}$ of the model, that is, $w_{G_l} = w_{G_l}^s$ and provide the current model weight $w_{G_l}$ to the local dot product module 564B. In certain embodiments, the loop of selecting s from the integers 0, 1, 2, . . . , S−1 by the local gradient module 561B is named the outer loop, and is performed locally in the l-th active worker. Kindly note that the model is configured to store a series of model weight as references. The current model weight at the end of each outer loop is defined as one of the reference model weights, and that reference model weight is used in the next outer loop.

The sampling module 562B is configured to, after the current model weight $w_{G_l}$ is defined as the reference model weight (or most recent historical model weight) $w_{G_l}^s$ or defined as the initialized model weight $w_{G_l}^0$ pick up an index i randomly from {1, . . . , n}, obtain the local instance $(x_i)_{G_l}$ from the local data $D^l$, and send the local instance to the local dot product module 564B. Here n is the number of training samples that are used for training the AFSVRG application 558B, and i is the index of the training samples. Each training sample includes the instance $(x_i)_{G_l}$ and its corresponding label $y_i$. The label $y_i$ is available to other modules, such as the SVRG module 568B for obtaining the stochastic gradient. In certain embodiments, every worker or computing device has the label $y_i$.

The local dot product module 564B is configured to, upon receiving the local instance $(x_i)_{G_l}$ from the sampling module 562B, and the current model weight $w_{G_l}$ and the reference model weight $w_{G_l}^s$ from the local gradient module 561B or stored in the model, calculate the current local dot product $(w)_{G_l}^T (x_i)_{G_l}$ between the current model weight and the local instance, calculate the reference local dot product (or most recent historical dot product) $(w^s)_{G_l}^T (x_i)_{G_l}$ between the reference model weight and the instance, and send the current local dot product and the reference dot product to the dot product summation module 566B. The reference model weight $w_{G_l}^s$ is a reference point and each outer loop has a defined $w_{G_l}^s$ while the current model weight is updated after each inner loop and thus each inner loop has a specific current model weight $w_{G_l}$. For example, in the first inner loop of the first outer loop, both the current model weight $w_{G_l}$ and the reference model weight $w_{G_l}^s$ would be the initialized model weight $w_{G_l}^0$ in the second inner loop of the first outer loop, the current model weight would be the model weight obtained after the first inner loop of the first outer loop, and the reference model weight $w_{G_l}^s$ would still be the initialized model weight $w_{G_l}^0$ in the first inner loop of the second outer loop, both the current model weight $w_{G_l}$ and the reference model weight would be the model weight updated in the last inner loop of the first outer loop; and in the second inner loop of the second outer loop, the current model weight $w_{G_l}$ would be the model weight obtained after the first inner loop of the second outer loop, while the reference model weight would still be the model weight obtained in the last inner loop of the first outer loop.

The dot product summation module 566B is configured to, upon receiving the current dot product $(w)_{G_l}^T (x_i)_{G_l}$ and the reference dot product $(w^s)_{G_l}^T (x_i)_{G_l}$ from the local dot product module 564B, request the coordinator 410 to compute the summation $\hat{w}^T x_i$ of the current dot products from the related workers and the summation $(w^s)^T x_i$ of the reference dot products from the related workers, and those dot products correspond to the instance $x_i$. In certain embodiments, the dot product from each worker is calculated using the current model weight and the reference model weight in that worker. In certain embodiments, the coordinator 410 is configured to use a tree structure to obtain the summation of the dot products, and the tree structure can be in the form of $T_1$, $T_2$ or any other types. After obtaining current summated dot product $\hat{w}^T x_i$ and reference summated dot product $(w^s)^T x_i$ by the coordinator 410, the dot product summation module 566B is further configured to send the summated dot products to the stochastic SVRG module 568B.

The SVRG module 568B is configured to, upon receiving the summated dot products $\hat{w}^T x_i$ and $(w^s)^T x_i$, compute the stochastic variance reduced gradient $\hat{v}^l$ from the summated dot products, and send the computed stochastic gradient to the updating module 570A. In certain embodiments, the SVRG module 568B is configured to compute the stochastic variance reduced gradient using the equation $\hat{v}_i^l = \nabla_{G_l} f_i(\hat{w}) - \nabla_{G_l} f_i(w^s) + \nabla_{G_l} f(w^s)$. In certain embodiments, the computation of the stochastic gradient $\hat{v}_i^l$ may be based on the equations (1) and (4) described above.

The updating module 570B is configured to, upon receiving the stochastic variance reduced gradient $\hat{v}^l$ from the stochastic module 568B, update the model weight using the stochastic variance reduced gradient and the learning rate γ. In certain embodiments, the learning rate is a constant learning rate. In certain embodiments, the update is performed using $w_{g_i} \leftarrow w_{g_i} - \gamma \cdot \hat{v}_i^l$. After updating the model weight, the updating module 570B is further configured to notify the sampling module 562B to sample another instance to perform another round of inner loop training. When the inner loop training is finished by exhausting the training instances, the updating module 570B is further configured to provide the current model weight as the (s+1)-th reference model weight, and notify the local gradient module 561B to start another round of outer loop training. When the outer loop is performed iteratively from 0 to S−1, or until the model weight is converged, the outer loop is finished, and the most current model weight is the output of the AFSVRG application 558B. The well trained model with the updated model weight can then be used for prediction.

In certain embodiments, the AFSVRG application 558B may further include a user interface and/or a scheduler. The user interface may be used for configuring parameters of the AFSVRG application 558B, for training of the AFSVRG application 558B, and for making predictions using the AFSVRG application 558B. The scheduler may be used to schedule the operations and the data flow between the modules of the AFSVRG application 558B, between the active worker and the coordinator, and between the active worker and the other workers.

Figure 5C:
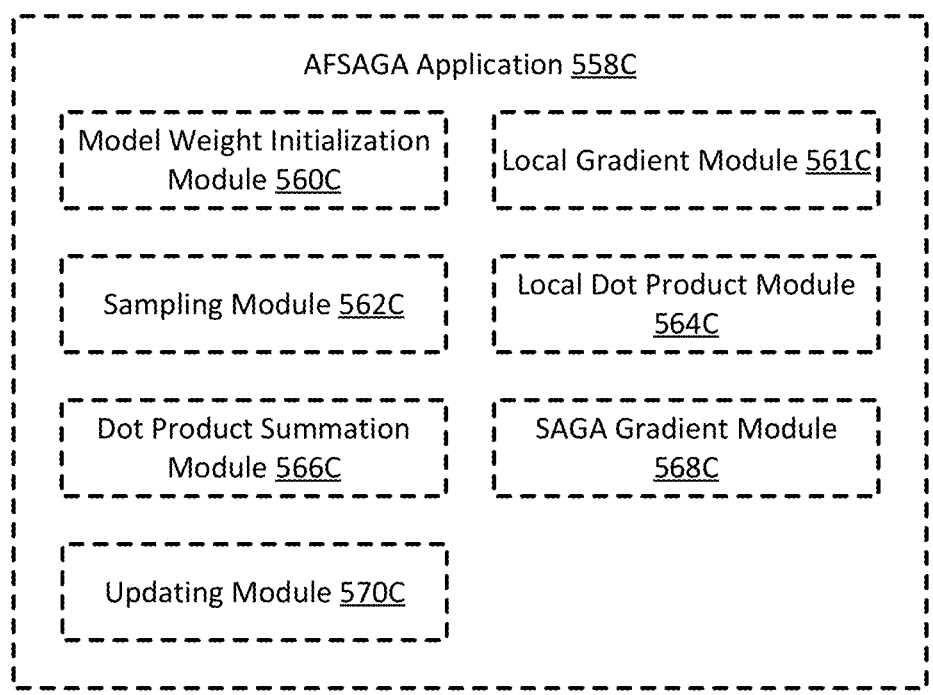
FIG. 5C schematically depicts an AFSAGA application for asynchronous federated learning according to certain embodiments of the present disclosure.

FIG. 5C schematically depicts the AFSAGA application 558C according to certain embodiments of the present disclosure. As shown in FIG. 5C, the AFSAGA application 558C includes a model weight initialization module 560C, a local gradient module 561C, a sampling module 562C, a local dot product module 564C, a dot product summation module 566C, a SAGA gradient module 568C, and an updating module 570C. In certain embodiments, the AFSAGA application 558C may include other applications or modules necessary for the operation of the AFSAGA application 558C, such as a listener configured to receive a notice or an instruction from the coordinator 410 or other workers 450. It should be noted that the modules 560C-570C are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named an AFSAGA model, which can be trained using training data, and after well trained, can be used to make a prediction. In certain embodiments, the function of the AFSAGA application 558C corresponds to Algorithm 5 described above. In certain embodiments, the AF SAGA application 558C is defined with a learning rate γ, and is provided with private data 472.

The model weight initialization module 560C is configured to initialize model weights of the AFSAGA application 558C, and provide the initialized model weight $w_{g_i}$ to the local gradient module 561C. In certain embodiments, the dimensions of the model weight is the same as the dimension of the local instance. In certain embodiments, each dimension of the model weight is a real number. During initialization, the model weight initialization module 560C may provide each dimension of the model weight with a random value, the value 0, or any other arbitrary values. During training using the training samples (instances and their corresponding labels), the model weight would be updated and be stored in the AFSAGA application 558C. In certain embodiments, during or after initialization, the AFSAGA model of the active worker is further configured to instruct the passive workers to initialize their respective model weights and run their respective training. In certain embodiments, the model weight initialization module 560C is further configured to instruct the sampling module 562C to start sampling an instance.

The local gradient module 561C is configured to, for each of training instances 1 to n, compute the local gradient, and send the computed local gradients of the instances to the SAGA module 568C. In certain embodiments, n is a positive integer corresponding to the total number of training instances. In certain embodiments, the local gradient module 561C is configured to compute the local gradient using the equation $\hat{\alpha}_i^l = \nabla_{g_l} f_i(w) \; \forall_i \in \{1, \ldots, n\}$. Referring to equations (1) and (5) described above, the calculation of the $f_i(w)$ requires calculation of dot products from different workers. In certain embodiments, the local gradient module 561C instructs the coordinator 410 to perform certain part of the computation using a tree-structured communication scheme. The sampling module 562C is configured to, when the model weight $w_{g_i}$ is initialized in the beginning of the training or when the model weight $w_{g_i}$ is updated after the training using the first instance, pick up an index i randomly from $\{1, \ldots, n\}$, obtain the local instance $(x_i)_{g_l}$ from the local data $D^l$, and send the local instance to the local dot product module 564C. Here n is the number of instances in the training data that are used for training the AFSAGA application 558C, and i is the index of the instances. Each training sample includes the instance $(x_i)_{g_l}$ and its corresponding label $y_i$. The label $y_i$ is available to other modules, such as the SAGA module 568C for obtaining the stochastic gradient. In certain embodiments, every worker or computing device has the label $y_i$.

The local dot product module 564C is configured to, upon receiving the current model weight $w_{g_i}$ from the model weight initialization module 560C or from the model weight stored in the model, and the local instance $(x_i)_{g_l}$ from the sampling module 562C, calculate the local dot product $(w)_{g_l}^T(x_i)_{g_l}$ between the current model weight and the picked instance, and send the local dot product to the dot product summation module 566C. In certain embodiment, the AFSAGA application 558C would use the initialized model weight in the first round of training, and use the updated model weight in the later training.

The dot product summation module 566C is configured to, upon receiving the current dot product $(w)_{g_l}^T(x_i)_{g_l}$ from the local dot product module 564C, request the coordinator 410 to compute the summation $\hat{w}^T x_i$ of the dot products from all the related workers, and those dot products correspond to the instance $x_i$. In certain embodiments, the dot product from each worker is calculated using the current model weight in that worker. In certain embodiments, the coordinator 410 is configured to use a tree structure to obtain the summation of the dot product, and the tree structure can be in the form of $T_1$, $T_2$ or any other types. After obtaining the summation $\hat{w}^T x_i$ by the coordinator 410, the dot product summation module 566C is further configured to send the summation to the SAGA module 568C. Kindly note the related workers is configured to perform their own training independently, not to use the instance corresponding to the same index i at the same time, the performance of the workers are asynchronous.

The SAGA module 568C is configured to, upon receiving the summated dot products $\hat{w}^T x_i$, compute the stochastic gradient $\hat{v}^l$ based on the summated dot product, and send the computed stochastic gradient to the updating module 570C. In certain embodiments, the SAGA module 568C is configured to compute the stochastic gradient using the equation $$\hat{v}_i^l = \nabla_{G_l} f_i(\hat{w}) - \hat{\alpha}_i^l + \frac{1}{l} \sum_{i=1}^{l} \hat{\alpha}_i^l.$$

In certain embodiments, the computation of the stochastic gradient $\hat{v}^l$ may be based on the equations (1) and (5) described above.

The updating module 570C is configured to, upon receiving the stochastic gradient $\hat{v}^l$ from the SAGA gradient module 568C, update the model weight $w_{G_l}$ using the stochastic gradient and the learning rate γ, and update the local gradient $\hat{\alpha}_i^l$. In certain embodiments, the learning rate is a constant learning rate. In certain embodiments, the update is performed using $w_{G_l} \leftarrow w_{G_l} - \gamma \cdot \hat{v}_i^l$ and $\hat{\alpha}_i^l \leftarrow \nabla_{G_l} f_i(\hat{w})$, respectively. After updating, the updating module 570C is further configured to notify the sampling module 562C to sample another instance to perform another round of training. With the updated model weight, the model can be used to make a prediction when an instance is inputted.

In certain embodiments, the AFSAGA application 558C may further include a user interface and/or a scheduler. The user interface may be used for configuring parameters of the AFSAGA application 558C, for training of the AFSAGA application 558C, and for making predictions using the AFSAGA application 558C. The scheduler may be used to schedule the operations and the data flow between the modules of the AF SAGA application 558C, between the active worker and the coordinator, and between the active worker and the other workers.

Figure 6A:
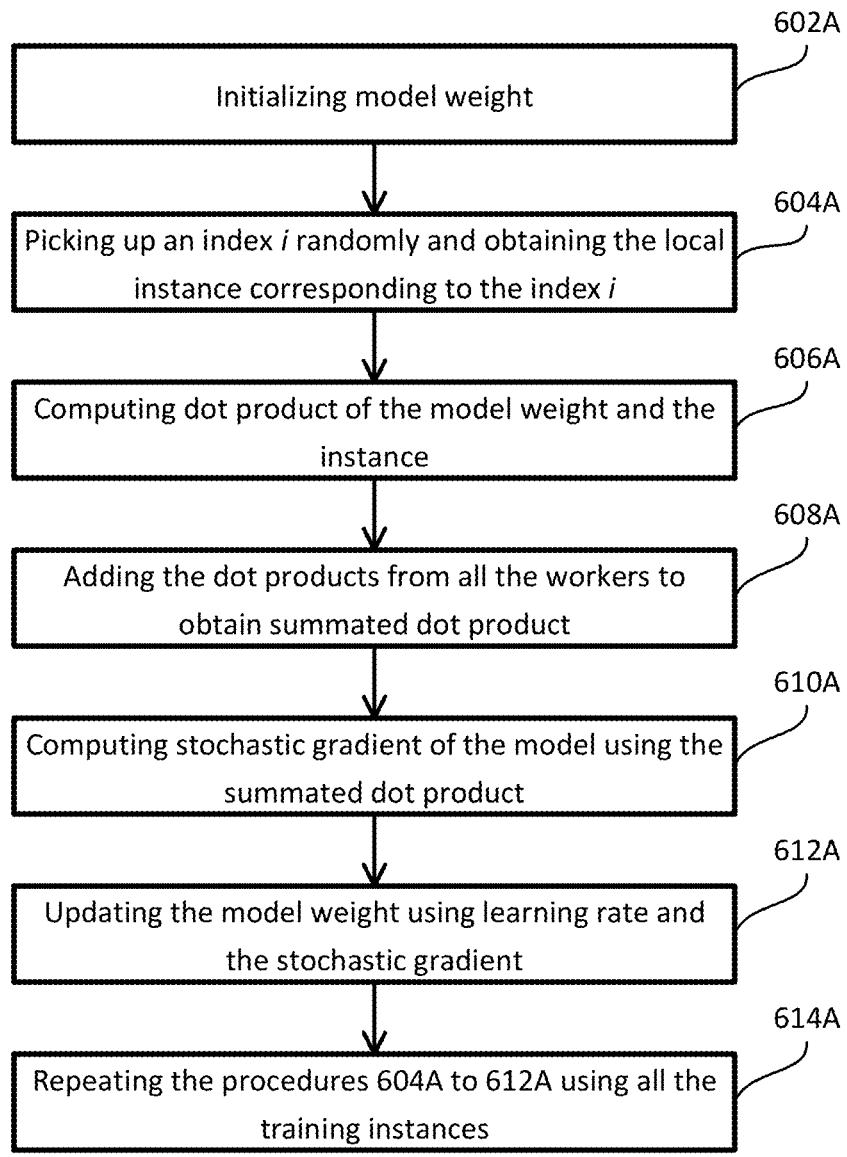
FIG. 6A schematically depicts an AFSGD training process for asynchronous federated learning according to certain embodiments of the present disclosure.

FIG. 6A schematically depicts an asynchronous federated stochastic gradient descent training process for vertically partitioned data (AFSGD-VP) according to certain embodiments of the present disclosure. In certain embodiments, the training process corresponds to Algorithm 3 described above. In certain embodiments, the training process is performed by a server computing device, such as the worker 450 shown in FIG. 4B, and specifically by the AFSGD application 558A shown in FIG. 5A. It should be particularly noted that, unless otherwise stated in the present disclosure, the steps of the AFSGD-VP training process or method may be arranged in a different sequential order, and are thus not limited to the sequential order as shown in FIG. 6A. In certain embodiments, the process 600A is performed on the l-th active worker of the workers 450. The l-th worker includes its specific local data $D^l$ which are not shared with other workers, and the l-th worker has its model parameters, such as the learning rate γ. In certain embodiments, the learning rate γ is a constant value in different iterations of the model.

As shown in FIG. 6A, at procedure 602A, the l-th worker operates as the active worker, the model weight initialization module 560A of the AFSGD application 558A initializes the model weight $w_{G_l}$ of the l-th worker, and sends the initialized model weight to the local dot product module 564A. The model weight $w_{G_l}$ has $d_l$ dimensions, and the value of each dimension is a real number. For initialization purpose, the values of the dimensions may be randomly set. The l-th worker then performs the following procedures 604-614 iteratively for all the training data. In certain embodiments, the model weight initialization module further instructs the sampling module 562A to start sampling. At this time, the l-th worker further instructs the passive workers to initialize their respective model weights and perform the procedures 604-614 locally to train their local AFSGD models. In certain embodiments, the active and passive workers perform the procedures in parallel. However, there is no need for the workers to wait for input from other workers, and the process is asynchronous. In other words, the active and passive workers do not have to train their respective models using the instances corresponding to the same index i at the same round of training.

At procedure 604A, upon receiving the instruction from the model weight initialization module 560A, the sampling module 562A picks up an index i randomly from $\{1, \ldots, n\}$, obtains the local instance $(x_i)_{G_l}$ from the local data $D^l$, and sends the local instance to the local dot product module 564A. In certain embodiments, since the parallel operation of the workers are asynchronous, there is no need for the workers to pick up the corresponding instances with the same index. In other words, there is no need for the active worker to send the random seed i to other workers, and each worker is likely to train using different instances at the same time.

At procedure 606A, upon receiving the initialized model weight from the model weight initialization module 560A and receiving the local instance $(x_i)_{G_l}$ from the sampling module 562A, the local dot product module 564A computes a dot product of the model weight and the local instance $(w)_{G_l}^T (x_i)_{G_l}$, and sends the dot product to the dot product summation module 566A. In certain embodiments, after training using the first instance and obtains the updated model weight, the following round of picking up another random instance and calculating the local dot product will use the updated model weight instead of the initialized model weight. In other words, the disclosure only needs to initialize the model weight once at the beginning of the training.

At procedure 608A, upon receiving the dot product from the local dot product module 564A, the dot product summation module 566A requests the coordinator 410 to compute the summation of the dot product $\hat{w}^T x_i$ corresponding to the instance $x_i$. In response to the request, the coordinator 410 computes the summation of the dot products from all the related workers corresponding to the index i, and sends the summated dot product $\hat{w}^T x_i$ to the stochastic gradient module 568A. In certain embodiments, the related workers may be defined in advance, and each of the related workers includes data corresponding to the index i. In certain embodiments, the coordinator 410 performs the summation using a tree-structured scheme. In certain embodiments, the summation is performed using the equation: $\hat{w}^T x_i = \sum_{l'=1}^{q} (\hat{w})_{G_{l'}}^T (x_i)_{G_{l'}}$. In certain embodiments, the summation is performed using the method shown in FIG. 7A or FIG. 7B.

At procedure 610A, upon receiving the summated dot product $\hat{w}^T x_i$ from the dot product summation module 566A, the stochastic gradient module 568A computes the stochastic gradient of the model using the summated dot product, and sends the stochastic gradient to the model updating module 570A. In certain embodiments, the stochastic gradient is calculated using the equation $\hat{v}_i^l = \nabla_{G_l} f_i(\hat{w})$. In certain embodiments, the gradient $\nabla_{G_l} f_i(\hat{w})$ can be calculated based on the problem to be solved. For example, for a binary classification, the gradient can be calculated using the equation (1) and the summated dot product.

At procedure 612A, upon receiving the stochastic gradient $\hat{v}^l$, the updating module 570A updates the model weight using the stochastic gradient and the learning rate γ, and instructs the sampling module 562A to pick up another sample for further training. In certain embodiments, the update is performed by: $w_{G_l} \leftarrow w_{G_l} - \gamma \cdot \hat{v}_i^l$. The updated model weight $w_{G_l}$ is save as the output of the process 600A.

At procedure 614A, the AFSGD application 558A continues the training process 604A-612A by picking up the other training samples. In certain embodiments, the training process ends when all the training instances have been used for training. After the model is well trained using all the training instances, the model weight is optimized. At this time, a user can enter an input instance to the model, and the model can provide a predicted result using the updated model weight.

Figure 6B:
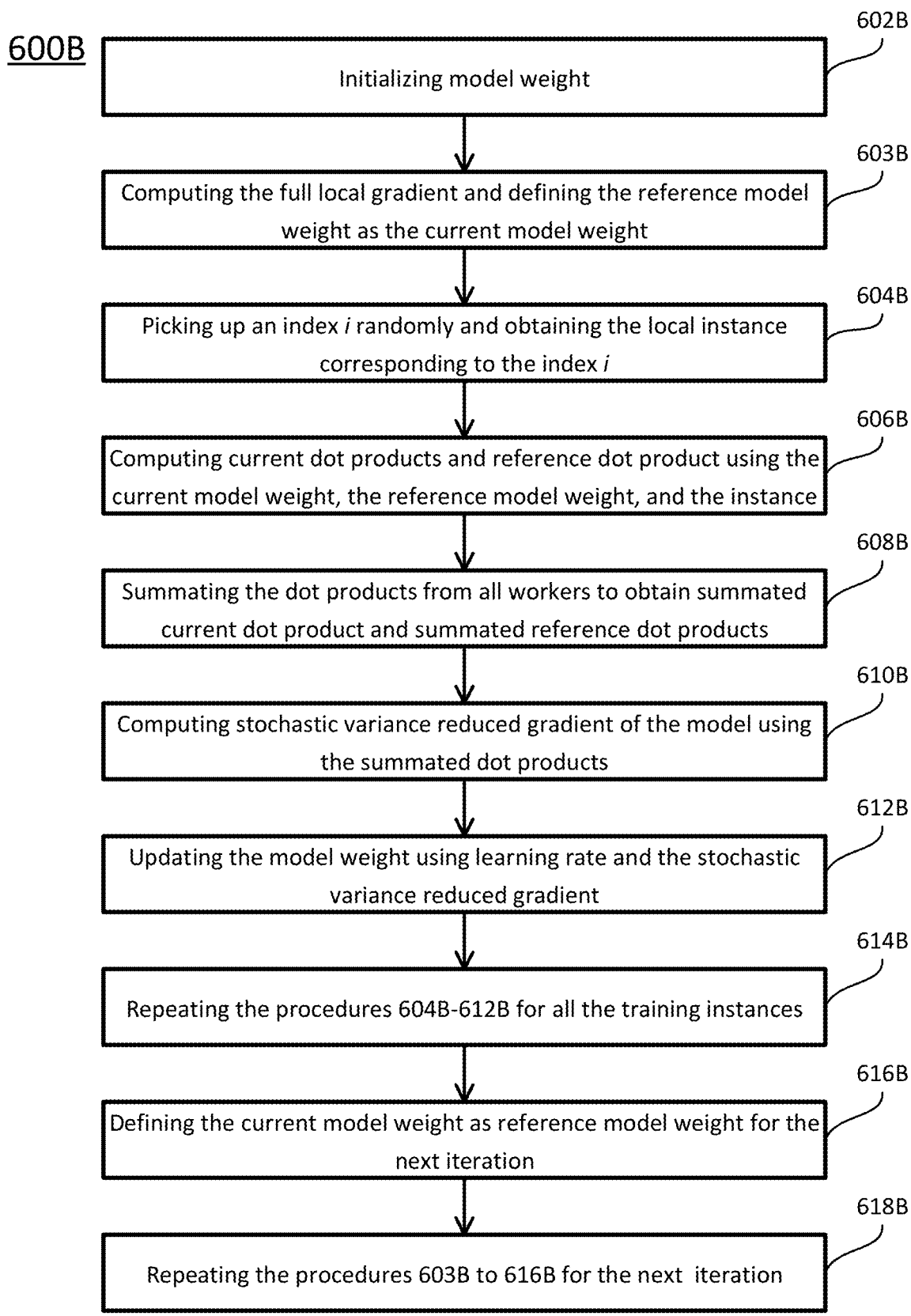
FIG. 6B schematically depicts an AFSVRG training process for asynchronous federated learning according to certain embodiments of the present disclosure.

FIG. 6B schematically depicts an asynchronous federated stochastic variance reduced gradient training process for vertically partitioned data (AFSVRG-VP) according to certain embodiments of the present disclosure. In certain embodiments, the training process corresponds to Algorithm 4 described above. In certain embodiments, the training process is performed by a server computing device, such as the worker 450 shown in FIG. 4B, and specifically by the AFSVRG application 558B shown in FIG. 5B. It should be particularly noted that, unless otherwise stated in the present disclosure, the steps of the AFSVRG-VP training process or method may be arranged in a different sequential order, and are thus not limited to the sequential order as shown in FIG. 6B. In certain embodiments, the process 600B is performed on the l-th active worker of the workers 450. The l-th worker includes its specific local data $D^l$ which are not shared with other workers, and the l-th worker has its model parameters, such as the learning rate γ. In certain embodiments, the learning rate γ is a constant value in different iterations of the model.

As shown in FIG. 6B, at procedure 602B, the model weight initialization module 560B of the AFSVRG application 558B initializes the model weight $w_{G_l}^0$ of the l-th worker, and sends the model weight $w_{G_l}^0$ to the local gradient module 561B. The model weight $w_{G_l}^0$ has $d_l$ dimensions, and the value at each dimension is a real number. Here the model weight is represented by $w_{G_l}^0$ instead of $w_{G_l}$ because there are two looped procedures in the following procedures. The superscript corresponds to the outer loop and the subscript corresponds to the inner loop. At this step, the model weight initialization module 560B further instructs the sample module 562B to start sampling an instance, and also instructs the passive workers to initialize their respective model weights and run their respective training.

At procedure 603B, upon receiving the model weight $w_{G_l}^0$ the local gradient module 561B instructs the coordinator 410 to calculate the full local gradient $$\nabla_{G_l} f(w^s) = \frac{1}{n} \sum_{i=1}^{n} \nabla_{G_l} f_i(w^s)$$

using a tree-structured communication scheme, defines the reference model weight (or the most recent historical model weight) $w_{G_l}^s$ as the model weight $w_{G_l}$, and provides the model weight $w_{G_l}$ to the local dot product module 564B. When s is 0, there is not historical model weight, and the initialized model weight $w_{G_l}^0$ is defined as the current model weight $w_{G_l}$. The loop of selecting s from the integers 0, 1, 2, . . . , S−1 is named the outer loop, and is performed by the l-th active worker locally. In certain embodiments, the value of S can be set at 100 or 1000 empirically depending on the problem to be solved and the number of inner loops. In certain embodiments, the value S is defined such that at the S−1 round, the full local gradient is close to 0.

At procedure 604B, upon receiving the instruction from the model weight initialization module 560B, the sampling module 562B picks up an index i randomly from {1, . . . , n}, obtains the local instance $(x_i)_{G_l}$ from the local data $D^l$, and sends the local instance to the local dot product module 564B. The local instance $(x_i)_{G_l}$ corresponds to the random index i. The step from this procedure 604B is performed in parallel in multiple workers, and each worker may pick up and train the model independently and asynchronously. There is no need for the workers to pick up the corresponding instances with the same index at roughly the same time frame, and there is no need for the active worker to send the index i to the other workers. When different workers perform their respective training at the same time, the i picked by the different workers are likely different from each other at the same time frame. In certain embodiments, the randomly picking up of the instances is named the inner loop.

At procedure 606B, upon receiving the local instance $(x_i)_{G_l}$ from the sampling module 562B, and the current model weight $w_{G_l}$ and the reference weight $w_{G_l}^s$ from the local gradient module 561B or stored in the model, the local dot product module 564B computes a current dot product $(w)_{G_l}^T(x_i)_{G_l}$ between the current model weight and the instance, and computes a reference dot product $(w^s)_{G_l}^T(x_i)_{G_l}$ between the reference model weight and the instance, respectively, and sends the current dot product and the reference dot product to the dot product summation module 566B.

At procedure 608B, upon receiving the current dot product $(w)_{G_l}^T(x_i)_{G_l}$ and the reference dot product $(w^s)_{G_l}^T(x_i)_{G_l}$ from the local dot product module 564B, the dot product summation module 566B instruct the coordinator 410 to add the q current local dot products from the q number of workers to obtain summated current dot product $\hat{x}^T x_i$, add the q reference dot products from the q number of workers to obtain summated reference dot product $(w^s)^T x_i$, and send the summated dot product to the dot product summation module 566B. The dot product summation module 566B then sends the summated dot products $\hat{w}^T x_i$ and $(w^s)^T x_i$ to the SVRG module 568B. In certain embodiments, the summation is performed using the equation: $\hat{w}^T x_i = \sum_{l=1}^{q} (w)_{G_l}^T(x_i)_{G_l}$, and $(w^s)^T x_i = \sum_{l=1}^{q} (w^s)_{G_l}^T(x_i)_{G_l}$. In certain embodiments, the summation is performed using a tree-structure scheme. In certain embodiments, each of the summations are performed using the method shown in FIG. 7A or FIG. 7B.

At procedure 610B, upon receiving the summated dot products $\hat{w}^T x_i$ and $(w^s)^T x_i$ from the dot product summation module 566B, the SVRG module 568B computes the stochastic variance reduced gradient of the model based on the summated dot products, and sends the stochastic variance reduced gradient to the model updating module 570B. In certain embodiments, the stochastic variance reduced gradient is calculated using the equation $\hat{v}_i^l = \nabla_{G_l} f_i(\hat{w}) - \nabla_{G_l} f_i(w^s) + \nabla_{G_l} f(w^s)$. In certain embodiments, the computation of the stochastic gradient $\hat{v}^l$ may be based on the equations (1) and (4) described above if the model is a binary model.

At procedure 612B, upon receiving the stochastic variance reduced gradient $\hat{v}^l$, the updating module 570B updates the model weight. In certain embodiments, the update is performed by: $w_{g_l} \leftarrow w_{g_l} - \gamma \cdot \hat{v}_i^l$.

At procedure 614B, the above procedures 604B-612B are performed iteratively in each worker using the training instances. The iteration of the procedures 604B-612B is named the inner loop. In certain embodiments, different workers perform this inner loop in parallel, but they work asynchronously because the workers pick their own i-th training instances independently. In other words, the different worker are likely training on different instances at the same time.

At procedure 616B, after model training using all the training instances in the inner loop, the updating module 570B defines $w_{g_l}^{s+1} = w_{g_l}$ Kindly note that the $w_{g_l}^s$ are a plurality of historical records of the model weight used as reference, and each iteration of outer loop corresponds to one reference model weight $w_{g_l}^s$, while $w_{g_l}$ is the current model weight that is being updated during each inner loop of the training.

At procedure 618B, the above procedures 603B-616B are repeated for another iteration, until a predefined S number of iterations are completed. In certain embodiments, the repetition of the procedures 603B-616B is named as the outer loop. In certain embodiments, the completion of the iterations may also be determined when the model weight converges. After completion of the S number of iterations or until the current model weight converges, the model weight is saved for the model, and the model weight optimized by training can be used for prediction.

Figure 6C:
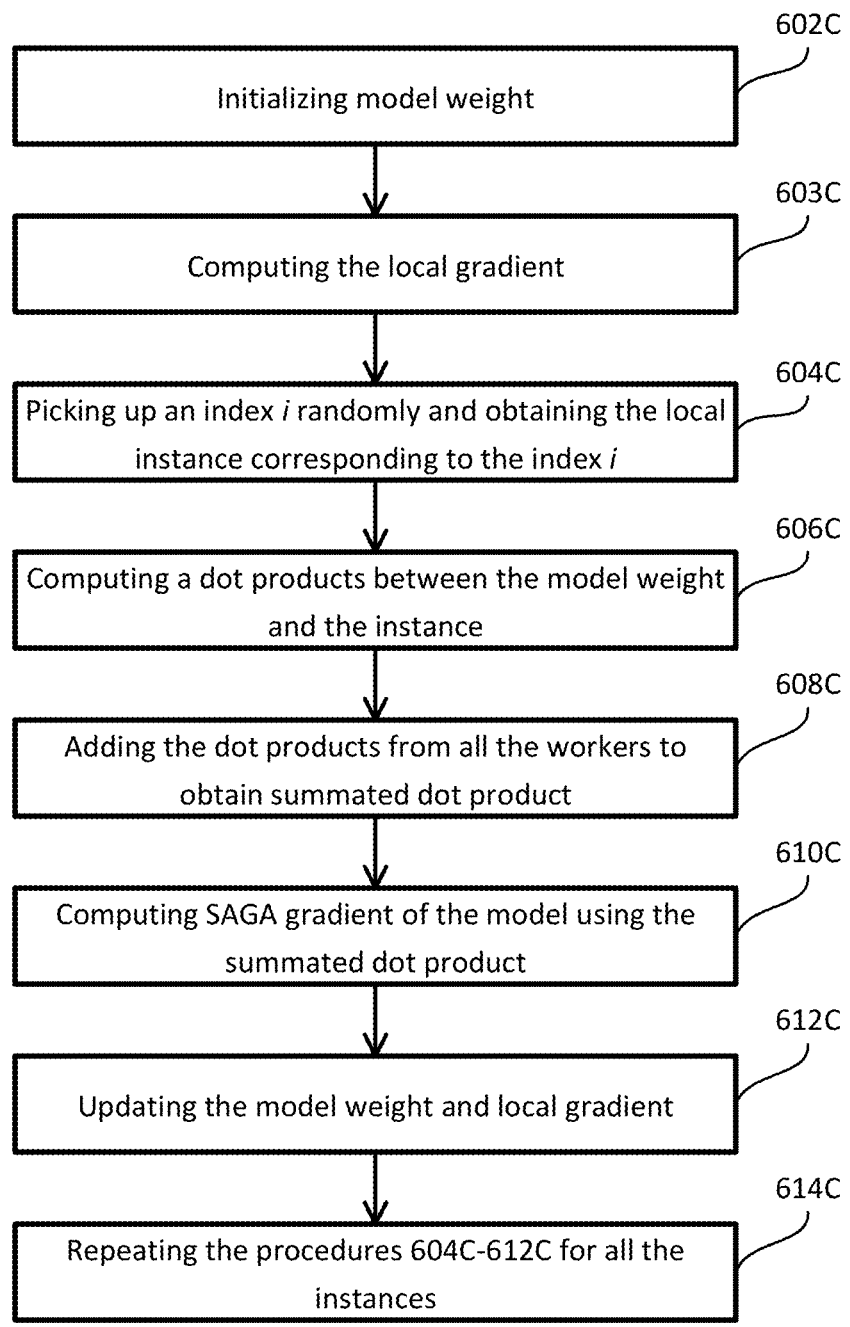
FIG. 6C schematically depicts an AFSAGA training process for asynchronous federated learning according to certain embodiments of the present disclosure.

FIG. 6C schematically depicts an asynchronous federated SAGA training process for vertically partitioned data (AF-SAGA-VP) according to certain embodiments of the present disclosure. In certain embodiments, the training process corresponds to Algorithm 5 described above. In certain embodiments, the training process is performed by a server computing device, such as the worker 450 shown in FIG. 4B, and specifically by the AFSAGA application 558C shown in FIG. 5C. It should be particularly noted that, unless otherwise stated in the present disclosure, the steps of the AFSAGA-VP training process or method may be arranged in a different sequential order, and are thus not limited to the sequential order as shown in FIG. 6C. In certain embodiments, the process 600C is performed on the l-th active worker of the workers 450. The l-th worker includes its specific local data $D^l$ which are not shared with other workers, and the l-th worker has its model parameters, such as the learning rate γ. In certain embodiments, the learning rate γ is a constant value in different iterations of the model.

As shown in FIG. 6C, at procedure 602C, the model weight initialization module 560C of the AFSAGA application 558C initializes the model weight $w_{g_l}$ of the l-th worker, where the model weight $w_{g_l}$ is selected from $\mathbb{R}^{d_l}$, and sends the model weight $w_{g_l}$ to the local gradient module 561C. In certain embodiments, the $\mathbb{R}^{d_l}$ indicates that the model weight $w_{g_l}$ has $d_l$ dimensions, and the value of each dimension is a real number. At this step, the model weight initialization module 560C further instructs the sample module 562C to start sampling an instance, and also instructs the passive workers to initialize their respective model weights and run their respective training.

At procedure 603C, upon receiving the model weight $w_{g_l}$, the local gradient module 561C calculates the local gradient $\hat{\alpha}_i^l = \nabla_{g_l} f_i(w)$, $\forall i \in \{1, \ldots, n\}$ using a tree-structured communication scheme, saves the calculated local gradient locally, and provides the local gradient to the SAGA gradient model 568C. This step is the initialization of the local gradient for each of the instances, and the initialized local gradients will be updated in the following procedures.

In certain embodiments. The following steps are performed by multiple workers in parallel. However, each worker may pick up and train the model independently and asynchronously. There is no need for the workers to pick up the corresponding instances with the same index at roughly the same time, and there is no need for the active worker to send the index i to the other workers. When different workers perform their respective training at the same time, the i picked by the different workers are likely different from each other at the same time frame.

At procedure 604C, upon receiving the instruction from the model weight initialization module 560C, the sampling module 562B picks up an index i randomly from 1 to n, obtains the local instance $(x_i)_{g_l}$ from the local data $D^l$, and sends the local instance to the local dot product module 564C. The local instance $(x_i)_{g_l}$ corresponds to the random index i.

At procedure 606C, upon receiving the local instance $(x_i)_{g_l}$ from the sampling module 562C and the current model weight from the local gradient module 561C or stored in the model, the local dot product module 564C computes a dot product $(w)_{g_l}^T (x_i)_{g_l}$ between the model weight and the instance, and sends the dot product to the dot product summation module 566C.

At procedure 608C, upon receiving the dot product $(w)_{g_l}^T (x_i)_{g_l}$ from the local dot product module 564C and the corresponding local dot products from the other related workers, the dot product summation module 566C adds the q local dot products from the q number of workers to obtain summated dot product, and sends the summated dot product to the SAGA gradient module 568C. In certain embodiments, the summation is performed using the equation: $\hat{w}^T x_i = \sum_{l'=1}^{q} (\hat{w})_{g_{l'}}^T (x_i)_{g_{l'}}$. In certain embodiments, the l-th active worker or the coordinator 410 instructs the passive workers to compute their respective dot products before the summation operation. In certain embodiments, the summations are performed using the method shown in FIG. 7A or FIG. 7B.

At procedure 610C, upon receiving the summated dot product from the dot product summation module 566C, the SAGA gradient module 568C computes the stochastic gradient of the model, and sends the gradient to the model updating module 570C. In certain embodiments, the gradient is calculated using the equation $$\hat{v}_i^l = \nabla_{g_l} f_i(\hat{w}) - \hat{\alpha}_i^l + \frac{1}{l} \sum_{i=1}^{l} \hat{\alpha}_i^l.$$

At procedure 612C, upon receiving the gradient $\hat{v}_i^l$, the updating module 570C updates the model weight by $w_{g_l} \leftarrow w_{g_l} - \gamma \cdot \hat{v}_i^l$ and updates the local gradient by $\hat{\alpha}_i^l \leftarrow \nabla_{g_l} f_i(\hat{w})$.

At procedure 614C, the procedures 604C-612C are performed iteratively using all the training instances one by one. In certain embodiments, all the related workers perform the procedures 604C-612C in parallel, but the related workers do not train the model using the instances corresponding to the same index i at the same time, and thus the training of the workers is asynchronous. After the training using all the training instances, the updating module 570C regards the updated model weight $w_{g_l}$ as the output of the model. At this time, a user can enter an input or instance to the model, and the model can make a prediction using the updated model weight.

Figure 7A:
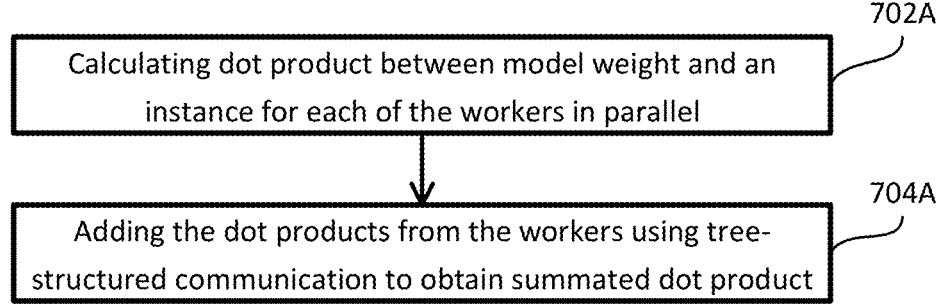
FIG. 7A schematically depicts a process for computing predicted value of a sample according to certain embodiments of the present disclosure.

FIG. 7A schematically depicts a method for summating dot products according to certain embodiments of the present disclosure. In certain embodiments, the method corresponds to Algorithm 1 described above. In certain embodiments, the method is performed by a server computing device, such as the worker 450 shown in FIG. 4B, and specifically by the local dot product modules 564A, 564B or 564C and the dot product summation modules 566A, 566B or 566C. For convenience of explaining the procedures in FIG. 7A and FIG. 7B, the modules 564A, 564B or 564C are named local dot production module 564, and the dot product summation modules 566A, 566B or 566C are named dot product summation module 566. In certain embodiments, the workers 450 cooperate with the coordinator 410 for the summation. It should be particularly noted that, unless otherwise stated in the present disclosure, the steps of the method may be arranged in a different sequential order, and are thus not limited to the sequential order as shown in FIG. 7A.

At procedure 702A, the local dot product module 564 of the active worker calculates its dot product $w_{G_{l'}}^T(x_i)G_{l'}$, and at the same time, the asynchronous federated application 458 instructs the other of the 1 to q workers to calculate their respective dot products $w_{G_{l'}}^T(x_i)G_{l'}$. In other words, the workers can calculate their respective dot products in parallel. Here $l'=1, \ldots, q$ indicates one of the workers.

At procedure 704A, the dot product summation module 566 of the active worker instructs the coordinator 410 to compute the summated dot product. Specifically, the coordinator 410 uses a tree-structured communication to add together the dot products from all the related workers. The summated dot product is defined by $\xi = \Sigma_{l'=1}^{q} w_{G_{l'}}^T(x_i)G_{l'}$.

By the above calculation of the dot products in parallel by the q workers 450 and summation of the dot products by the coordinator 410 using a tree structure, the summated dot product is obtained and available for other modules.

In certain embodiments, when an instance $x_i$ is inputted by a user, the summated dot product is used for prediction of the instance $x_i$. In certain embodiments, for binary classification problem, the prediction of $x_i$ is $sgn(x_i)$, where $sgn(x_i)$ is 1 if the summated dot product is larger than 0, and otherwise −1. For regression problem, the prediction of $x_i$ is directly the summated dot product in regard to $x_i$.

Figure 7B:
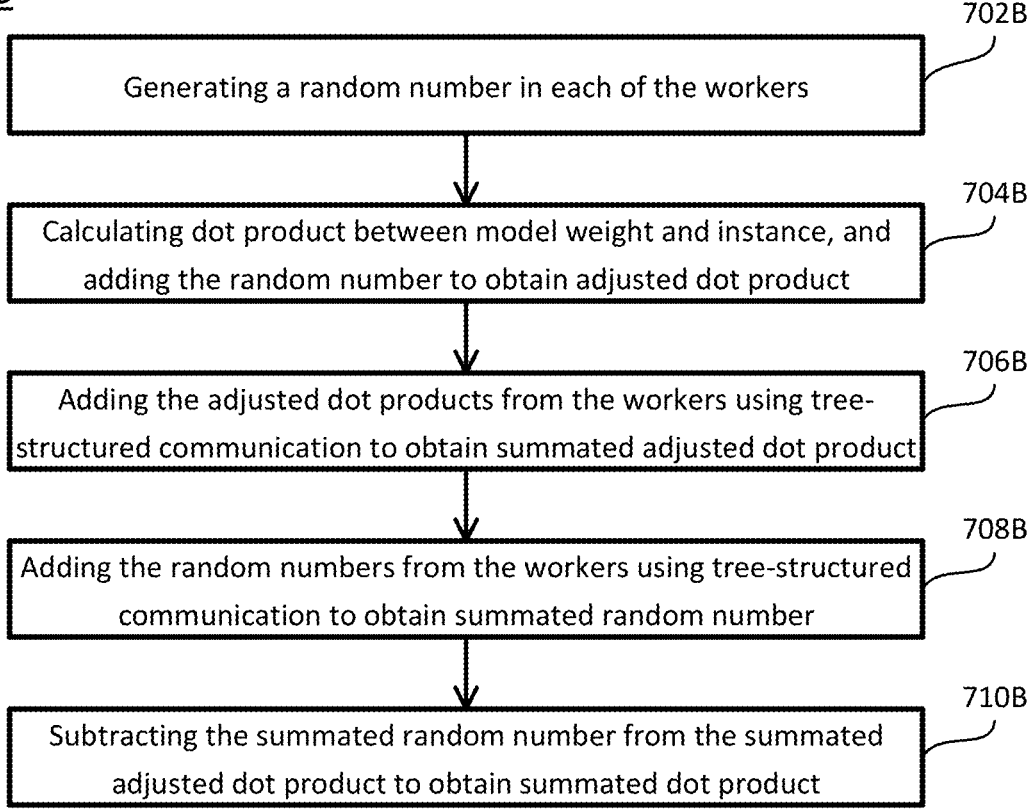
FIG. 7B schematically depicts a process for computing predicted value of a sample according to certain embodiments of the present disclosure.

FIG. 7B schematically depicts a method for summating dot product according to certain embodiments of the present disclosure. In certain embodiments, the method corresponds to Algorithm 2 described above. In certain embodiments, the method is performed by a server computing device, such as the worker 450 shown in FIG. 4B, and specifically by the local dot product module 564 and the dot product summation module 566. It should be particularly noted that, unless otherwise stated in the present disclosure, the steps of the method may be arranged in a different sequential order, and are thus not limited to the sequential order as shown in FIG. 7B.

At procedure 702B, the local dot product module 564 of the active worker generates a random number $b''$. In certain embodiments, the value of the generated random number is in a range of $[0, 2\pi]$.

At procedure 704B, the local dot product module 564 of the active worker calculates its adjusted dot product $w_{G_{l'}}^T(x_i)G_{l'} + b''$. At the same time, the local dot product module 564 of the active worker also instructs the other of the 1 to q workers to generate their random numbers and to calculate their respective adjusted dot products. In other words, the workers can generate their own random numbers and calculate their respective adjusted dot products in parallel. Here $l'=1, \ldots, q$ indicates one of the workers.

At procedure 706B, after the q workers have generated their respective random number and calculated their respective adjusted dot products, the dot product summation module 566 of the active worker instructs the coordinator 410 to compute the summated adjusted dot product. Specifically, the coordinator 410 uses a first tree-structured communication to add together the adjusted dot products from all the related workers. The summated adjusted dot product is defined by $\xi = \Sigma_{l'=1}^{q}(w_{G_{l'}}^T(x_i)G_{l'} + b'')$. In certain embodiments, the first tree structure may be any form of a tree structure, such as the tree structure $T_1$ shown in FIG. 3A.

At procedure 708B, the dot product summation module 566 of the active worker instructs the coordinator 410 to compute the summated random number. Specifically, the coordinator 410 uses a second tree structure to add together the random numbers from all the related workers. The summated random number is defined by $\bar{b} = \Sigma_{l'=1}^{q} b''$, where $\{1, \ldots, q\}$ are the workers. In certain embodiments, the second tree structure is significantly different from the first tree structure. In certain embodiments, the second tree structure may be any form of a tree structure, such as the tree structure $T_2$ shown in FIG. 3B.

At procedure 710B, the dot product summation module 566 of the active worker subtracts the summated random number from the summated adjusted dot product to obtain summated dot product. In certain embodiments, the procedure is performed using $\xi - \bar{b}$.

By adding a random number element to the adjusted dot product, and using the first and second tree-structured communication that are significantly different from each other, data privacy of the communication is efficiently preserved.

In certain embodiments, when the instance have a great number of dimensions, FIG. 7A is preferred and the process is simpler and faster than the process shown in FIG. 7B. In certain embodiments, when the instance have only a few dimensions, FIG. 7B is preferred which has added security. In certain embodiments, the procedures in FIG. 7A and FIG. 7B can be used for prediction.

In certain aspects, the present disclosure relates to a non-transitory computer readable medium storing computer executable code. In certain embodiments, the computer executable code may be the software stored in the storage device 456 as described above. The computer executable code, when being executed, may perform one of the methods described above.

In certain aspects, the present disclosure relates to a method of using the well-trained model to predict result for an instance. In certain embodiments, the disclosure uses the procedures described in any of FIGS. 6A-6C to train a model and uses the procedures described in any of FIGS. 7A and 7B to make a prediction for a given sample. In certain embodiments, the disclosure makes a prediction on whether a loan should be issued to a customer based on the customer's online finance information from a digital finance company, online shopping pattern from an e-commerce company, and bank information from a traditional bank. The prediction may be initiated by a server from any of the three entities, but the three entities do not need to share their real customer data, and the three entities can perform the training asynchronously.

As described above in connection to the methods and modules, in certain embodiments, the asynchronous training indicates that for the active worker and the passive workers, they train their respective models by picking their own random samples. As a result, at the same time, the active worker may be training its model using an instance corresponding to a first index, and one of the passive worker may be training its model using an instance corresponding to a second index. When the active worker finishes training using the first instance, it can continue the training immediately by picking, for example, a third instance corresponding to the third index. When the passive worker finishes training using the second instance, it can continue the training immediately by picking, for example, a fourth instance corresponding to the fourth index. There is no need for one of the active and passive workers to wait for another one of the active and passive workers after finishing training using one instance.

In comparison, for synchronous training, the active and the passive workers train their models using the instances corresponding to the same index at the same time, although the instances having different data features. When one of the active and passive workers finishes training using a first instance corresponding to the first index, it will wait for the other workers to finish the same round of training using their respective first instances corresponding to the same first index. When all the workers finish the round of training, the active and passive workers then start the training using their respective instances corresponding to, for example, the same second index. Therefore, the concept of synchronous training here does not mean that the workers train their respective models using the exact same data, does not mean that they start to operate at exactly the same time point because the active worker may need to start first, and the workers are likely to end the same round of training at slight different time due to the different complexity of the instances they used and different computation power the workers have.

Examples. Exemplary experiments have been conducted using the model according to certain embodiments of the present disclosure.

The asynchronous vertical SGD, SVRG and SAGA algorithms (i.e., AFSGD-VP, AFSVRG-VP and AFSAGA-VP) are compared with synchronous version of vertical SGD, SVRG and SAGA (denoted as FSGD-VP, FSVRG-VP and FSAGA-VP, respectively) on classification and regression tasks, where FSVRG-VP is almost the same to FD-SVRG described by Zhang et al., 2018. For the classification tasks, the disclosure considers the $l_2$-norm regularized logistic regression model as follows:

$$\min_w f(w) = \frac{1}{l} \sum_{i=1}^{l} \log(1 + e^{-y_i w^T x_i}) + \frac{\lambda}{2} \|w\|^2 \quad (6)$$

For the regression tasks, the disclosure uses the ridge linear regression method with $l_2$-norm regularization as follows:

$$\min_{w,b} f(w, b) = \frac{1}{l} \sum_{i=1}^{l} (w^T x_i + b - y_i)^2 + \frac{\lambda}{2} (\|w\|^2 + b^2) \quad (7)$$

To fully demonstrate the scalability of the asynchronous vertical federated learning algorithms of the disclosure, the disclosure conducts experiments on eight datasets as summarized in FIG. 8 (Table 1) for binary classification and regression tasks. Two real and relatively small financial datasets, UCICreditCard and GiveMeSomeCredit are from the Kaggle website (https://www.kaggle.com/datasets). The other six datasets are from the LIBSVM web site (https://www.csie.ntu.edu.tw/cjlin/libsvmtools/datasets/). The disclosure splits news20, url and webspam datasets into training data and testing data randomly with a ratio of 4:1. The disclosure also uses rcvl's testing data for training and training data for testing as there are more instances in the testing data.

Design of Experiments. In the experiments, we not only verify the theoretical results of AFSGD-VP, AFSVRG-VP and AFSAGA-VP, but also show that our algorithms have much better efficiency than the corresponding synchronous algorithms (i.e., FSGD-VP, FSVRG-VP and FSAGA-VP). Our asynchronous algorithms are implemented under the decentralized framework, where a worker own its own part of data and model parameters. There is no master node for aggregating data/features/gradients which may lead to undesired user information disclosure. Instead, we utilize a coordinator as in FIG. 2 to collect the product computed from local data and parameters from other workers. Each worker node can independently call the coordinator to enable the asynchronous model update. The aggregation of local product is performed in a demand-based manner, which means that only when a worker node needs to update its local parameter will it request the coordinator to pull the local product from other worker nodes. Different from horizontal federated learning, it will be much harder for an attacker to restore the information of the user data in a worker node using the local product than the gradient.

Experiment Settings. We run all the experiments on a cluster with 32 nodes of 20-core Intel Xeon E5-2660 2.60 GHz (Haswell). The nodes are connected with 56 Gb FDR. We use OpenMPI v3.1.1 with multi-thread support for communication between worker processes and Armadillo v9.700.3 for efficient matrix computation. Each worker is placed on a different machine node. For the $l_2$ regularization term, we set the coefficient $\lambda = 1e^{-4}$ for all experiments. We also choose the best learning rate $\in (5e^{-1}, 1e^{-1}, 5e^{-2}, 1^{e-2}, \ldots)$ for each algorithm on different learning tasks. There is a synthetic straggler node which may be 40% to 300% slower than the fastest worker node to simulate the real application scenario. In practice, it is normal that different parties in a federated learning system will possess different computation and communication power and resources.

Implementation Details. In our asynchronous algorithms, each worker node performs computation rather independently. The main thread of a worker process performs the major workload of gradient computation and model update operation. Another listener thread keeps listening for the request and sends back the local product to the requesting source. The computation diagram can be summarized as follows for a worker: (1) Randomly select an index of the data. (2) Call the coordinator to broadcast the index to the listeners of other workers. (3) Reduce the sum of the local product back from the listeners. (4) Perform gradient computation and model parameters update. Note that the local product is computed based on a worker's current parameters. Overall speaking, however, some workers may have updated their parameters more times than other workers. Different from asynchronous horizontal algorithms, although the worker processes run asynchronously, all the parameters a worker uses to compute gradient is most up-to-date. The broadcast and reduce operation are also realized in a tree-structured scheme to reduce communication costs.

Classification Tasks

Evaluations Using Real Financial Datasets. We first compared our asynchronous federated learning algorithm with synchronous version on financial datasets to demonstrate the ability to address real application. In asynchronous algorithms, each worker saves its local parameters every fixed interval for testing. In the synchronous setting, each worker saves the parameters every fixed number of iterations as all the workers run at the same pace. We follow this scheme for the other experiments.

The original total numbers of features of UCICreditCard and GiveMeSomeCredit dataset are 23 and 10 respectively. We apply one-hot encoding for categorical features and standardize other features column-wisely. The numbers of features become 90 and 92 respectively after the simple data preprocessing.

Figure 9A:
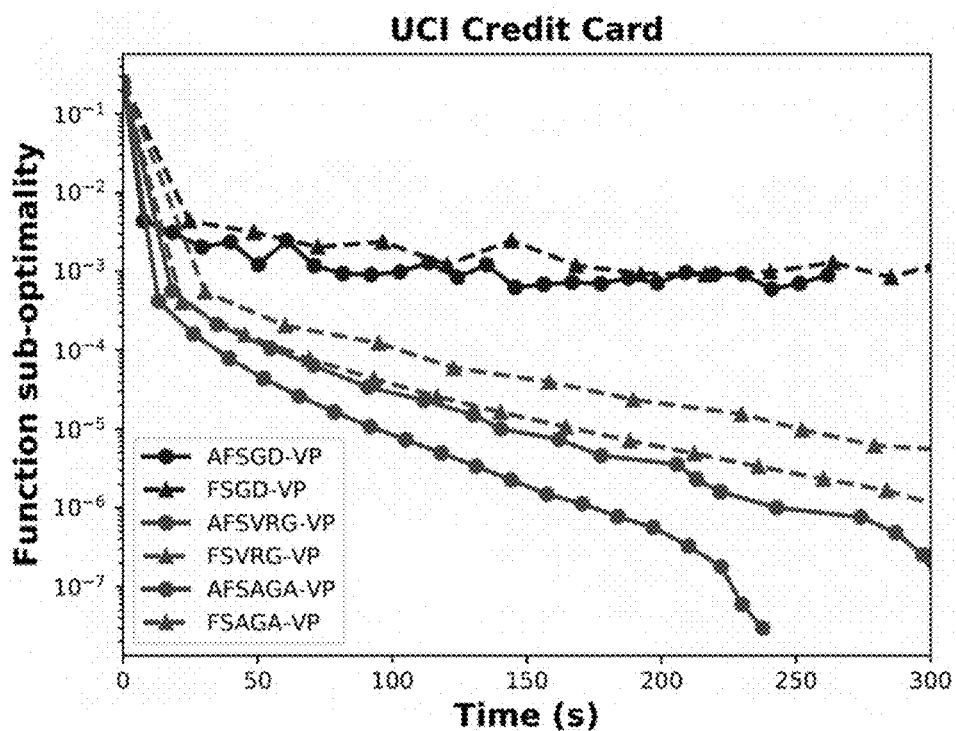
FIGS. 9A and 9B schematically depict convergence of different algorithms for classification task according to certain embodiments of the present disclosure.
Figure 9B:
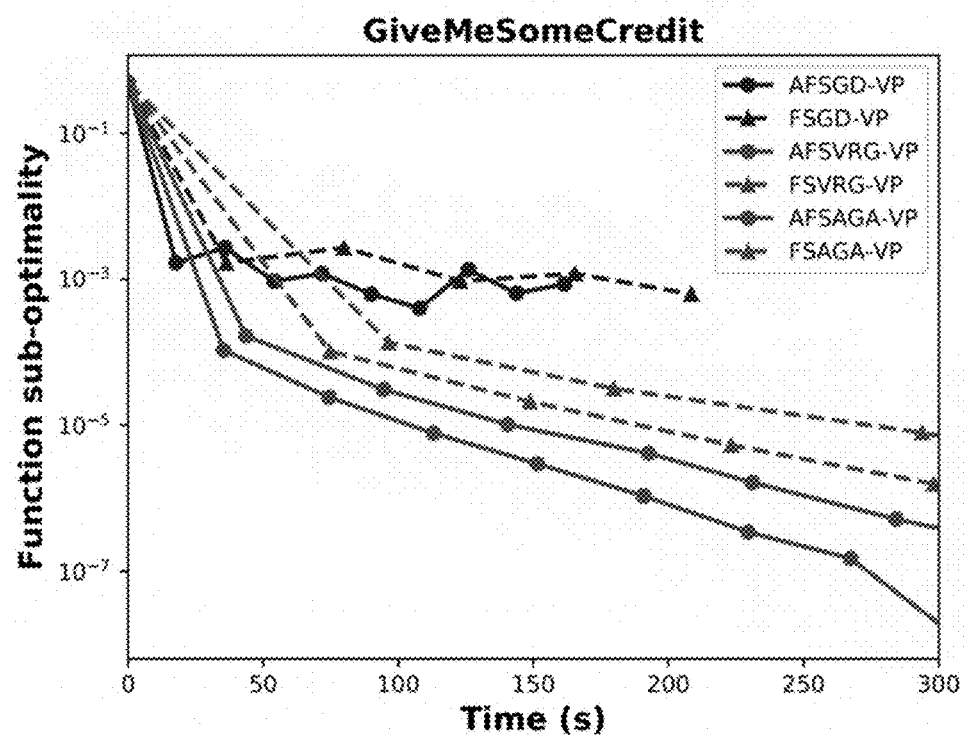

Four worker nodes are used in this part of the experiment. FIG. 9A and FIG. 9B schematically depicts convergence of different algorithms for classification task according to certain embodiments of the disclosure. As shown in FIG. 9A and FIG. 9B, our asynchronous vertical algorithms (solid lines) consistently surpass their synchronous counterparts (dotted lines). The y-axis function sub-optimality represents the error of objective function to the global optimal. The shape of the convergence curve is firstly determined by the optimization method we choose, i.e., SGD, SVRG and SAGA. The error precision of SGD is usually higher than SVRG, while that of SAGA is similar to SVRG. Then the convergence speed is mostly influenced by the computation and communication complexity. In asynchronous settings there is no inefficient idle time to wait for other workers, so the update frequency is much higher, which results in faster convergence speed of our asynchronous algorithm with regard to wall clock time.

Evaluations Using Large-Scale Datasets. Previous experiments show that our asynchronous federated learning algorithms could address real financial problems more efficiently. In this part we will use large-scale benchmark datasets, i.e. large number of data instances and high-dimensional features, for further validations. In our experiments, 8 worker nodes are used for experiments on new20 and rcv1 datasets; 16 worker nodes are used for experiments on url and webspam datasets. The results are visualized in FIGS. 10A-D. As the total computation budget grows, the speedup of the asynchronous algorithm becomes more obvious. So it will be much more efficient when put into large-scale practical use. Our asynchronous SGD, SVRG and SAGA surpass their synchronous counterparts in the experiments on all the four datasets.

Figure 9C:
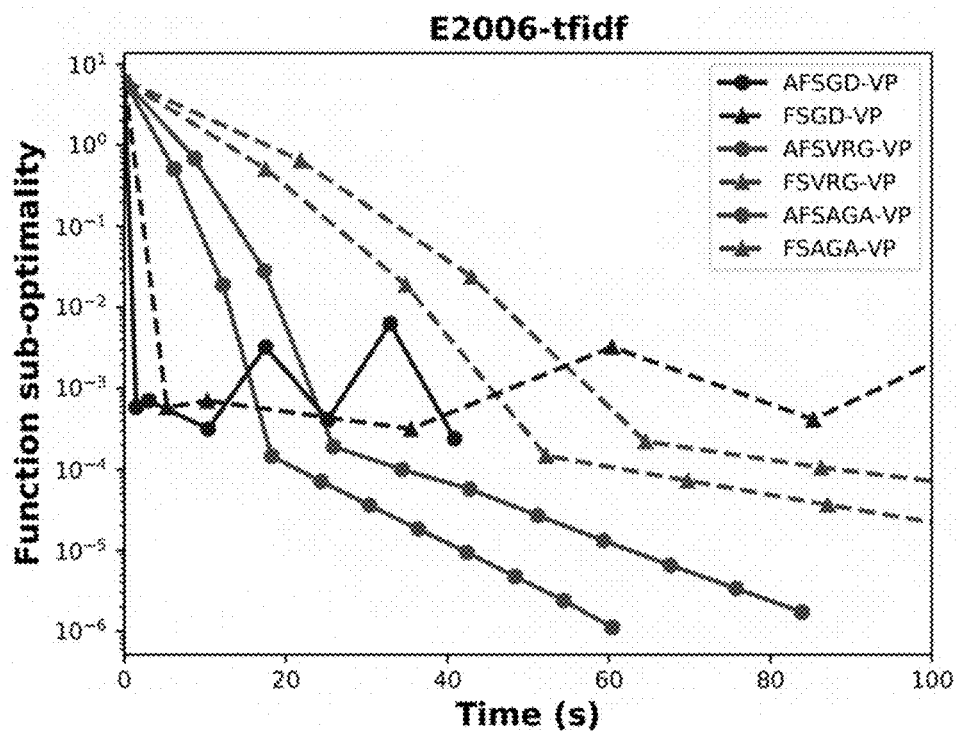
FIGS. 9C and 9D schematically depict convergence of different algorithms for regression task according to certain embodiments of the present disclosure.
Figure 9D:
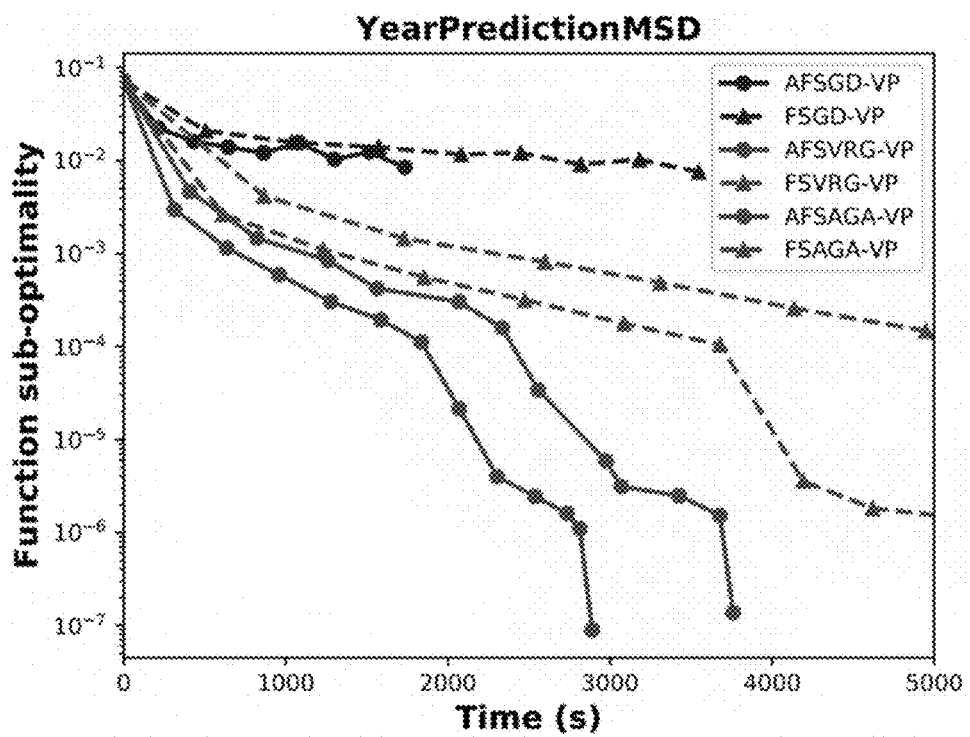
Figure 10A:
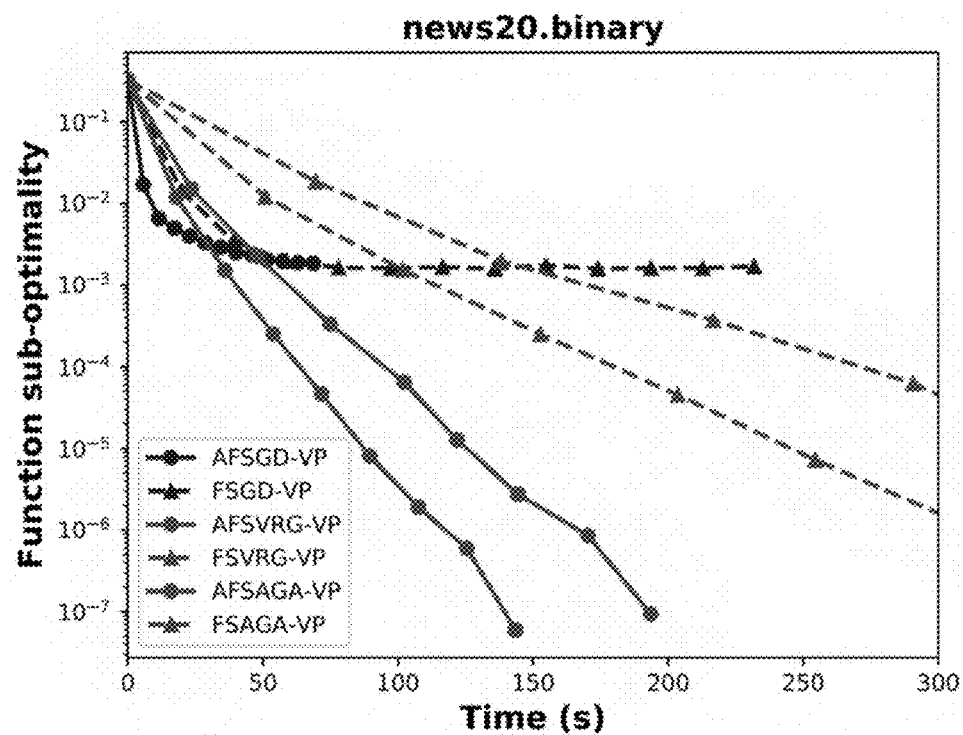
FIGS. 10A-10D schematically depict convergence of different algorithms for binary classification task on more large-scale datasets according to certain embodiments of the present disclosure.
Figure 10B:
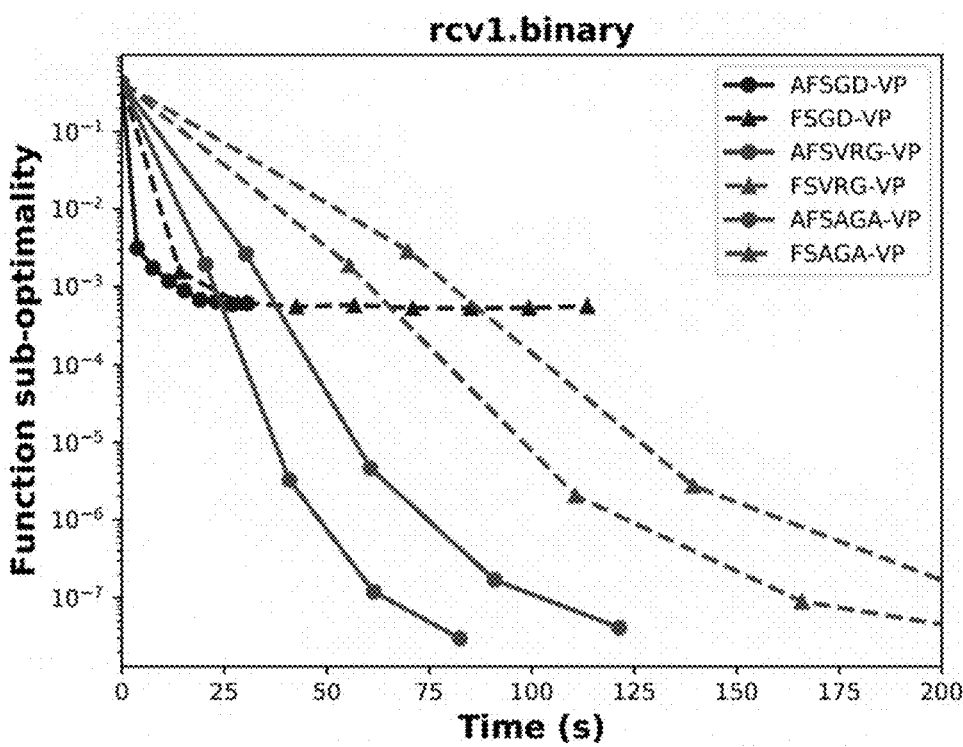
Figure 10C:
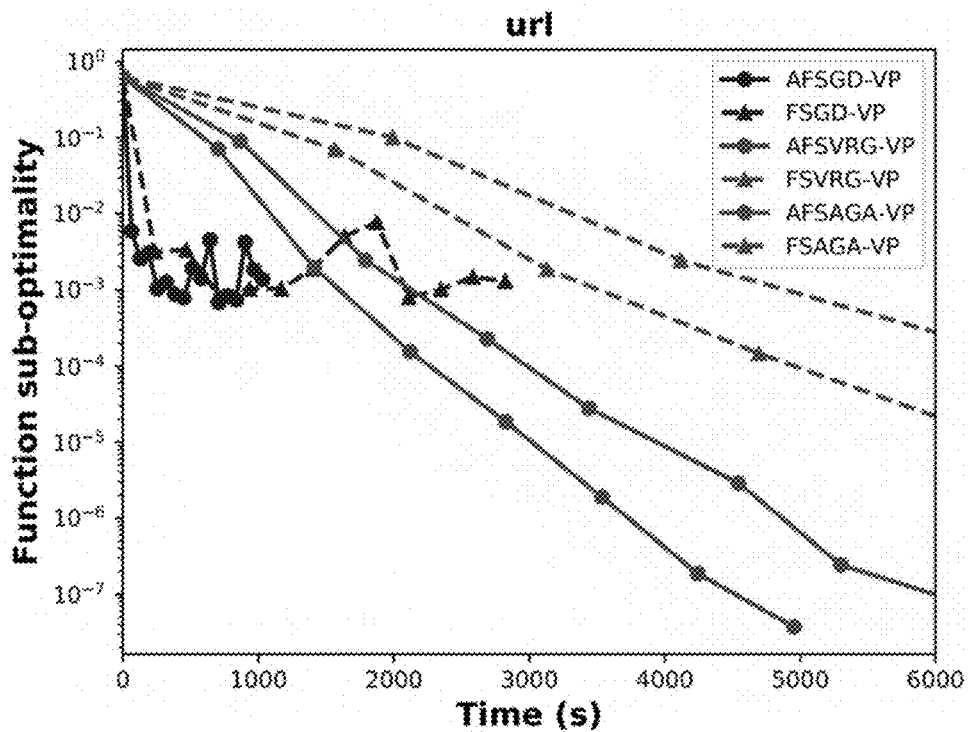
Figure 10D:
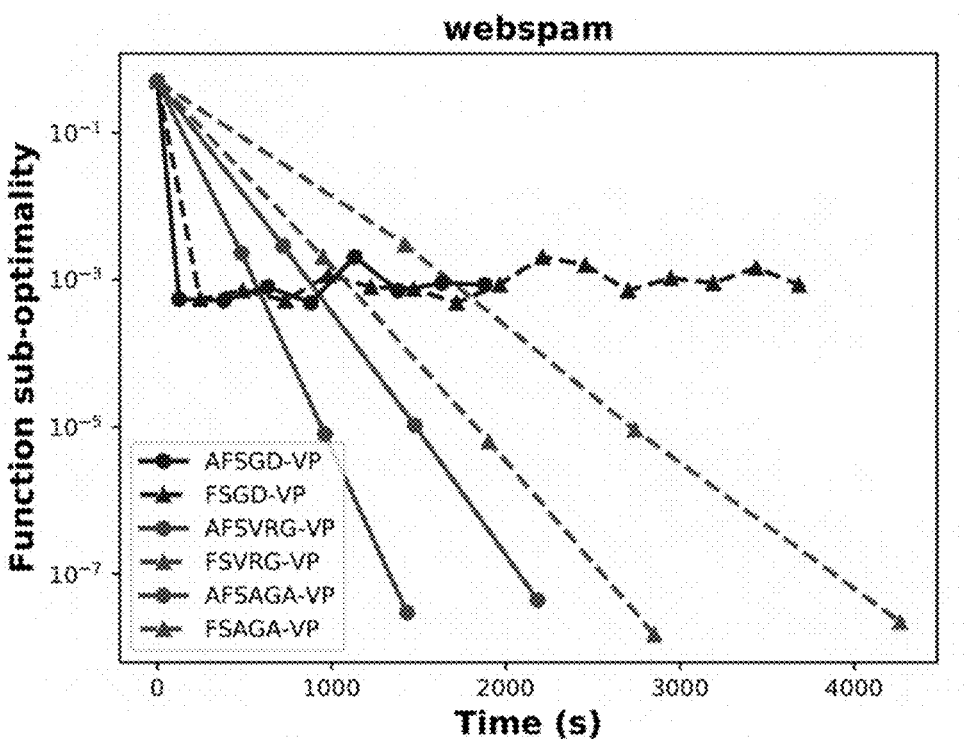

Regression Tasks. To further illustrate the advantages of asynchronous algorithms that they can scale to various tasks, we also conduct experiments on regression problems as shown by FIG. 9C and FIG. 9D. Both the E20060-tfidf with a smaller number of data instances but a larger number of features, and the YearPredictionMSD with larger number of instances but a smaller number of features are tested. Four worker nodes are used in this experiment and similar conclusions as previous can be reached.

Asynchronous Efficiency. The speedup results of asynchronous algorithms compared with synchronous ones are summarized in FIG. 11 (Table 2). The speedup is computed based on the time when the algorithm reaches a certain precision of optimality ($1e^{-4}$ for SVRG and SAGA; $1e^{-2.5}$ or $1e^{-1.5}$ for SGD based on different datasets).

Figures 11, 12:
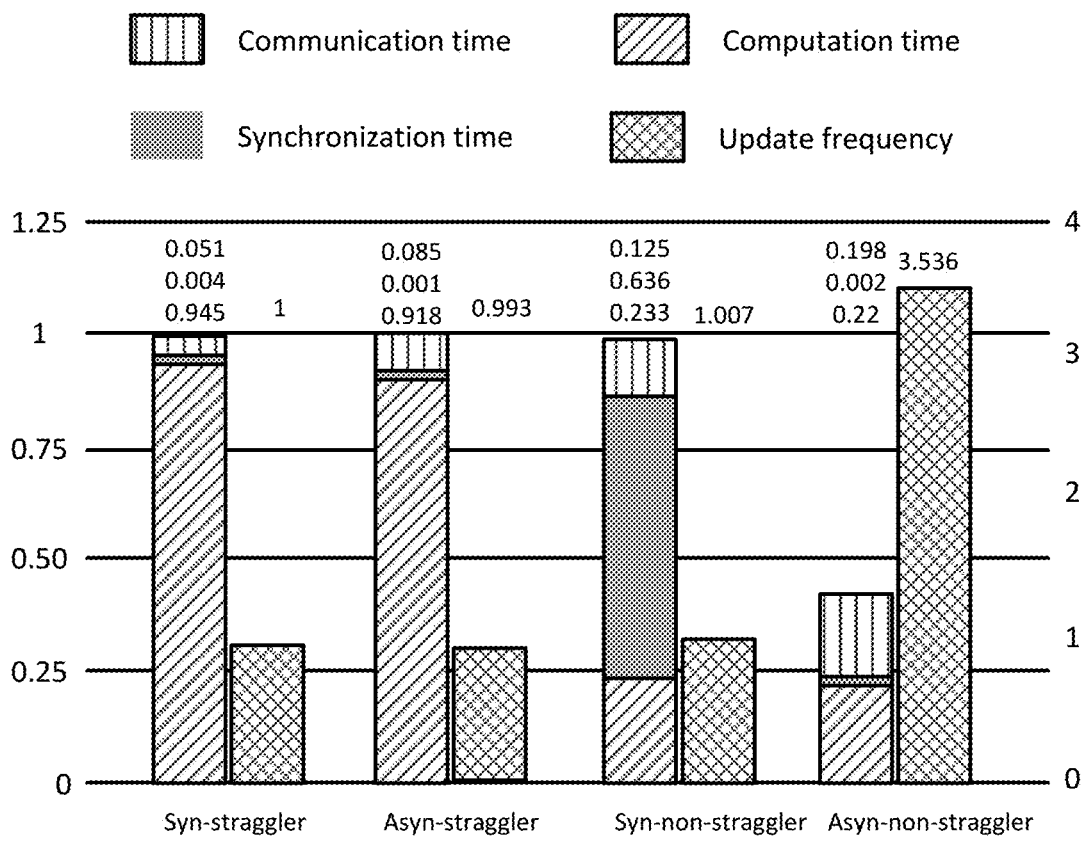
FIG. 11 summarizes speedup results of asynchronous algorithms compared with synchronous algorithms according to certain embodiments of the present disclosure.
FIG. 12 schematically shows asynchronous efficiency according to certain embodiments of the present disclosure, where eight workers operate on url dataset for binary classification task.

To further analyze the efficiency of our asynchronous algorithms, we quantify the composition of the time consumption of asynchronous and synchronous algorithms as in FIG. 12. The execution time and update frequency are scaled by those of the straggler in the synchronous algorithm. The computation time of stragglers is much higher than non-stragglers, which leads to a large amount of synchronization time for non-stragglers in synchronous algorithms. While in our asynchronous algorithms, non-stragglers pull the update-to-date product information from stragglers without waiting the straggler to finish its current iteration. As a result, the synchronization time is eliminated. Although the communication cost increases because each worker needs to independently aggregate product from other workers, we can achieve a large gain in terms of the update frequency.

Figure 13A:
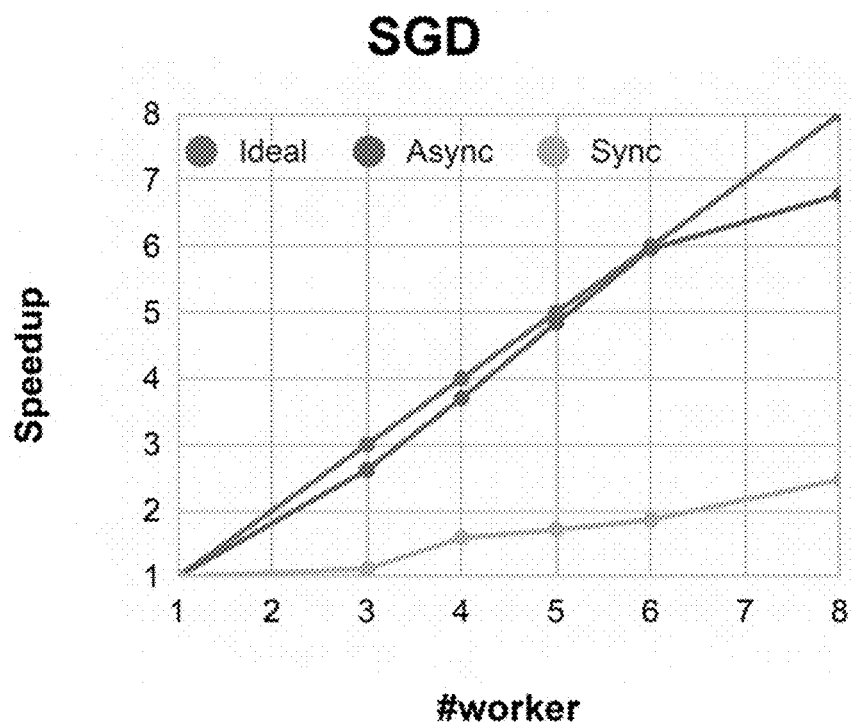
FIGS. 13A-13C show scalability of certain embodiments of the present disclosure, where the scalability is evaluated on url dataset for classification task.
Figure 13B:
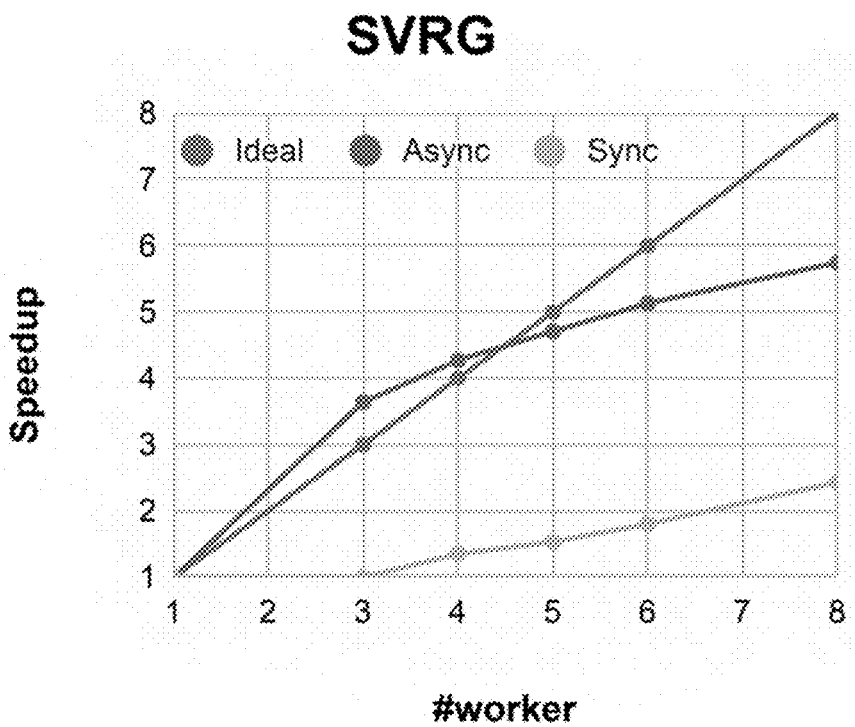
Figure 13C:
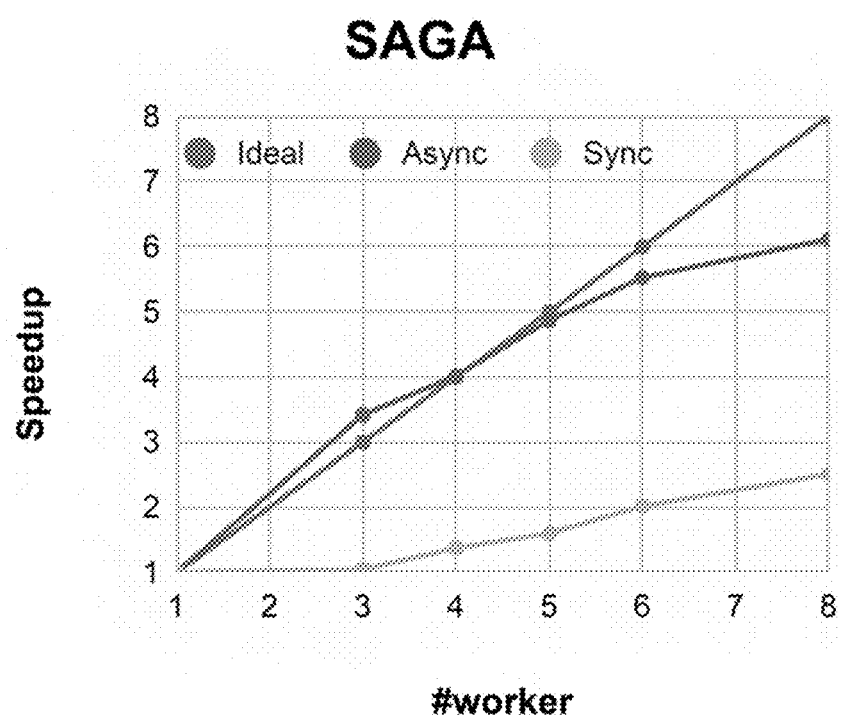

Scalability. The scalability in terms of number of workers is shown in FIGS. 13A-13C. Synchronous algorithms cannot address the problem of straggler and behaves poorly. Using synchronization barrier keeps nonstragglers inefficiently waiting for the straggler. Our asynchronous algorithms behave like ideal in the beginning as they can address the straggler problem well, and deviate from ideal when the number of workers continues to grow because the communication overheads will limit the speedup.

In conclusion, the disclosure provides an asynchronous federated SGD (AFSGD-VP) algorithm and its SVRG and SAGA variants for vertically partitioned data. To the best of our knowledge, AFSGD-VP and its SVRG and SAGA variants are the first asynchronous federated learning algorithms for vertically partitioned data. Importantly, the disclosure provides the convergence rates of AFSGD-VP and its SVRG and SAGA variants under the condition of strong convexity for the objective function. The disclosure also proves the model privacy and data privacy. Extensive experimental results on a variety of vertically partitioned datasets not only verify the theoretical results of AFSGD-VP and its SVRG and SAGA variants, but also show that the algorithms have much better efficiency than the corresponding synchronous algorithms.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

LISTING OF REFERENCES (INCORPORATED HEREIN BY REFERENCE IN THEIR ENTIRETY)

[1] Nadeem Badshah, Facebook to contact 87 million users affected by data breach, The Guardian, Apr. 8, 2018.
[2] Amir Beck and Luba Tetruashvili, On the Convergence of block coordinate descent type methods, SIAM Journal on Optimization, 2013, 23(4), 2037-2060.
[3] Leon Bottou, Large-scale machine learning with stochastic gradient descent, Proceedings of COMPSTAT'2010, Springer, 2010, 177-186.

[4] Chih-Chung Chang and Chih-Jen Lin, LIBSVM: a library for support vector machines, ACM Transactions on Intelligent Systems and Technology, 2011, 2: 1-27.

[5] Kewei Cheng, Tao Fan, Yilun Jin, Yang Liu, Tianjian Chen, and Qiang Yang, Secureboost: A lossless federated learning framework, 2019, arXiv:1901.08755.

[6] Bryan Conroy and Paul Sajda, Fast, exact model selection and permutation testing for l2-regularized logistic regression, International Conference on Artificial Intelligence and Statistics, 2012, 246-254.

[7] Aaron Defazio, Francis Bach, and Simon Lacoste-Julien, SAGA: a fast incremental gradient method with support for non-strongly convex composite objectives, NIPS'14: Proceedings of the 27th International Conference on Neural Information Processing Systems, 2014, 1646-1654.

[8] Wenliang Du and Mikhail J. Atallah, Privacy-preserving cooperative statistical analysis, Proceedings of the 17$^{th}$ Annual Computer Security Applications Conference, 2001, 102-110.

[9] Regulation (EU) 2016/679 of the European Parliament and of the Council of 27 Apr. 2016, https://eur-lex.europa.eu/legal-content/EN/TXT/?uri=CELEX:02016R0679-20160504.

[10] Cong Fang, Chris Junchi Li, Zhouchen Lin, and Tong Zhang, SPIDER: near-optimal non-convex optimization via stochastic path-integrated differential estimator, Advances in Neural Information Processing Systems 31, 2018, 689-699.

[11] Adria Gascon, Phillipp Schoppmann, Borja Balle, Mariana Raykova, Jack Doerner, Samee Zahur, and David Evans, Secure linear regression on vertically partitioned datasets, IACR Cryptology ePrint Archive, 2016, 892.

[12] Adria Gascon, Phillipp Schoppmann, Borja Balle, Mariana Raykova, Jack Doerner, Samee Zahur, and David Evans, Privacy-preserving distributed linear regression on high-dimensional data, Proceedings on Privacy Enhancing Technologies, 2017, (4): 345-364.

[13] Richard L. Graham, Timothy S. Woodall, and Jeffrey M. Squyres, Open MPI: A flexible high performance MPI, International Conference on Parallel Processing and Applied Mathematics, 2005, 228-239.

[14] Bin Gu, Zhouyuan Huo, Cheng Deng, and Heng Huang, Faster derivative-free stochastic algorithm for shared memory machines, Proceedings of the 35th International Conference on Machine Learning, 2018, 1807-1816.

[15] Bin Gu, Zhouyuan Huo, and Heng Huang, Asynchronous stochastic block coordinate descent with variance reduction, 2016, arXiv:1610.09447.

[16] Stephen Hardy, Wilko Henecka, Hamish Ivey-Law, Richard Nock, Giorgio Patrini, Guillaume Smith, and Brian Thorne, Private federated learning on vertically partitioned data via entity resolution and additively homomorphic encryption, 2017, arXiv: 1711.10677.

[17] Thomas Hofmann, Aurelien Lucchi, Simon Lacoste-Julien, and Brian McWilliams, Variance reduced stochastic gradient descent with neighbors, Advances in Neural Information Processing Systems 28, 2015, 2305-2313.

[18] Zhouyuan Huo and Heng Huang, Asynchronous mini-batch gradient descent with variance reduction for non-convex optimization, Thirty-First AAAI Conference on Artificial Intelligence, 2017, 2043-2049.

[19] Alan F. Karr, Xiaodong Lin, Ashish P. Sanil and Jerome P. Reiter, Privacy-preserving analysis of vertically partitioned data using secure matrix products, Journal of Official Statistics, 2009, 25(1): 125-138.

[20] Vyacheslav Kungurtsev, Malcolm Egan, Bapi Chatterjee, and Dan Alistarh, Asynchronous stochastic subgradient methods for general nonsmooth nonconvex optimization, 2019, arXiv: 1905.11845.

[21] Rémi Leblond, Fabian Pedregosa, and Simon Lacoste-Julien, ASAGA: Asynchronous parallel SAGA, Proceedings of the 20th International Conference on Artificial Intelligence and Statistics, 2017, 54: 46-54.

[22] Xingguo Li, Tuo Zhao, Raman Arora, Han Liu, and Mingyi Hong, An improved convergence analysis of cyclic block coordinate descent-type methods for strongly convex minimization, Proceedings of the 19th International Conference on Artificial Intelligence and Statistics, 2016, 51: 491-499.

[23] Xingguo Li, Tuo Zhao, Raman Arora, Han Liu, and Mingyi Hong, On faster convergence of cyclic block coordinate descent-type methods for strongly convex minimization, J. Mach. Learn. Res. 18, 2018, 1-24.

[24] Yang Liu, Yingting Liu, Zhijie Liu, Junbo Zhang, Chuishi Meng, and Yu Zheng, 2019, arXiv: 1905.10053.

[25] Yang Liu, Zhuo Ma, Ximeng Liu, Siqi Ma, Surya Nepal, and Robert H. Deng, Boosting privately: privacy-preserving federated extreme boosting for mobile crowd-sensing, Cryptography and Security, 2019, arXiv: 1907.10218.

[26] Horia Mania, Xinghao Pan, Dimitris Papailiopoulos, Benjamin Recht, Kannan Ramchandran, and Michael I Jordan, Perturbed iterate analysis for asynchronous stochastic optimization, 2015, arXiv: 1507.06970.

[27] Qi Meng, Wei Chen, Jingcheng Yu, Taifeng Wang, Zhi-Ming Ma, and Tie-Yan Liu, Asynchronous stochastic proximal optimization algorithms with variance reduction, 2016, arXiv: 1609.08435.

[28] Yu Nesterov, Efficiency of coordinate descent methods on huge-scale optimization problems, SIAM Journal on Optimization, 2012, 22(2): 341-362.

[29] Lam M Nguyen, Jie Liu, Katya Scheinberg, and Martin Takac, SARAH: A novel method for machine learning problems using stochastic recursive gradient, Proceedings of the 34th International Conference on Machine Learning, 2017, 70: 2613-2621.

[30] Richard Nock, Stephen Hardy, et al., Entity resolution and federated learning get a federated resolution, 2018, arXiv preprint arXiv: 1803.04035.

[31] Nhan H Pham, Lam M Nguyen, Dzung T Phan, and Quoc Tran-Dinh, ProxSARAH: An efficient algorithmic framework for stochastic composite nonconvex optimization, 2019, arXiv: 1902.05679.

[32] Conrad Sanderson and Ryan Curtin, Armadillo: a template-based C++ library for linear algebra, Journal of Open Source Software, 2016, 1(2): 26.

[33] Ashish P. Sanil, Alan F. Karr, et al., Privacy preserving regression modelling via distributed computation, Proceedings of the Tenth ACM SIGKDD International Conference on Knowledge Discovery and Data Mining, 2004, 677-682.

[34] Mark Schmidt, Nicolas Le Roux, and Francis Bach, Minimizing finite sums with the stochastic average gradient, Mathematical Programming B, Springer, 2017, 162(1-2): 83-112.

[35] Xia Shen, Moudud Alam, Freddy Fikse, and Lars Ronnegard, A novel generalized ridge regression method for quantitative genetics, Genetics, 2013, 193(4): 1255-1268.

[36] Jinhyun So, Basak Guler, Amir Salman Avestimehr, and Payman Mohassel, CodedPrivateML: A Fast and Privacy-Preserving Framework for Distributed Machine Learning, 2019, arXiv: 1902.00641.

[37] Johan A K Suykens and Joos Vandewalle, Least squares support vector machine classifiers, Neural Processing Letters, 1999, 9(3): 293-300.

[38] Jaideep Vaidya and Chris Clifton, Privacy preserving association rule mining in vertically partitioned data, Proceedings of the Eighth ACM SIGKDD International Conference on Knowledge Discovery and Data Mining, 2002, 639-644.

[39] Li Wan, Wee Keong Ng, Shuoguo Han, and Vincent C. S. Lee, Privacy preservation for gradient descent methods, Proceedings of the 13th ACM SIGKDD International Conference on Knowledge Discovery and Data Mining, 2007, 775-783.

[40] ZheWang, Kaiyi Ji, Yi Zhou, Yingbin Liang, and Vahid Tarokh, SpiderBoost: A class of faster variance-reduced algorithms for nonconvex optimization, 2018, arXiv: 1810.10690.

[41] Lin Xiao and Tong Zhang, A proximal stochastic gradient method with progressive variance reduction, SIAM Journal on Optimization, 2014, 24(4): 2057-2075.

[42] Qiang Yang, Yang Liu, Tianjian Chen, and Yongxin Tong, Federated machine learning: Concept and applications, ACM Transactions on Intelligent Systems and Technology (TIST), 2019, 10(2): article 12.

[43] Hwanjo Yu, Jaideep Vaidya, and Xiaoqian Jiang, Privacy-preserving SVM classification on vertically partitioned data, Pacific-Asia Conference on Knowledge Discovery and Data Mining, Springer, 2006, 647-656.

[44] Gong-Duo Zhang, Shen-Yi Zhao, Hao Gao, and Wu-Jun Li, Feature-distributed SVRG for high-dimensional linear classification, 2018, arXiv: 1802.03604.

[45] Shen-Yi Zhao and Wu-Jun Li, Fast asynchronous parallel stochastic gradient descent: a lock-free approach with convergence guarantee, Thirtieth AAAI Conference on Artificial Intelligence, 2016, 2379-2385.

[46] Ian Goodfellow, Yoshua Bengio, Aaron Courville, Deep learning, MIT Press, 2016, http://www.deeplearningbook.org.

What is claimed is:

1. A system comprising an active computing device and at least one passive computing device in communication with each other, wherein each of the active and passive computing devices comprises a federated learning model and local data, the active computing device comprises a processor and a storage device storing computer executable code, and the computer executable code, when executed at the processor, is configured to:

train the federated learning model in the active computing device using dimensions of a plurality of training instances in the active computing device; and instruct the at least one passive computing device to train the federated learning model in the at least one passive computing device using dimensions of a plurality of training instances in the at least one passive computing device, wherein the plurality of training instances in the active and the at least one passive computing devices are indexed, and index of one of the plurality of training instances picked up by the at least one passive computing device is independent from index of one of the plurality of training instances picked up by the active computing device at the same time, such that training of the federated learning model in the active computing device and training of the federated learning model in the at least one passive computing device are asynchronous.

2. The system of claim 1, wherein parameters of the federated learning model comprise a constant learning rate.

3. The system of claim 1, further comprising a coordinator in communication with the active and the at least one passive computing devices, wherein transfer of intermediate results between an active worker and at least one passive worker is performed using a tree-structured scheme via the coordinator.

4. The system of claim 1, wherein the computer executable code is configured to train the federated learning model in the active computing device by:

picking up i-th of the instances in an active worker, wherein i is the index of the training instances;

computing an active dot product between current model weight in the active computing device and the dimensions of the i-th of the instances in the active computing device;

instructing the at least one passive computing device to compute a passive dot product between current model weight in the at least one passive computing device and the dimensions of the i-th of the instances in the at least one passive computing device;

summating the active and passive dot products to obtain summated dot product;

calculating stochastic gradient of the federated learning model using the summated dot product; and updating the model weight using the stochastic gradient and learning rate of the federated learning model.

5. The system of claim 4, wherein the stochastic gradient is calculated using $\hat{v}_i^l = \nabla_{\mathcal{G}_l} f_i(\hat{w})$, $f_i(\hat{w})$ is regularized loss corresponding to loss of the i-th instance, and $\nabla_{\mathcal{G}_l} f_i(\hat{w})$ is the gradient of the regularized loss in regard to the dimensions in the active computing device.

6. The system of claim 1, wherein the computer executable code is configured to train the federated learning model in the active computing device by:

for each of a first number of iterations:

calculating a full local gradient for the instances in the active computing device;

performing in parallel and independently in each of an active worker and at least one passive worker:

picking up one of the instances;

computing a current dot product between a current model weight and the one of the instances and a reference dot product between a reference model weight and the one of the instances;

instructing the at least one passive computing device to compute its current dot product and its reference dot product using an instance corresponding to the one of the instances;

summating the current dot products from the active and the at least one passive computing device to obtain summated current dot product, and summating the reference dot products from the active and the at least one passive computing device to obtain summated reference dot product;

calculating stochastic gradient of the federated learning model using the summated current dot product and the summated reference dot product; and updating the model weight using the stochastic gradient and learning rate of the federated learning model to obtain updated model weight; and defining the updated model weight as a new reference model weight.

7. The system of claim 6, wherein the stochastic gradient is calculated using $\hat{v}_i^I = \nabla_{G_l} f_i(\hat{w}) - \nabla_{G_l} f_i(w^s) + \nabla_{G_l} f(w^s)$, $f_i(\hat{w})$ is regularized loss corresponding to loss of the i-the instance, $f_i(w^s)$ is regularized loss corresponding to the loss of the i-th instance in regard to reference model weight, $f(w^s)$ is the regularized empirical risk, and $\nabla_{G_l} f_i(\hat{w})$, $\nabla_{G_l} f_i(w^s)$, and $\nabla_{G_l} f(w^s)$ are respectively the gradients of $f_i(\hat{w})$, $f_i(w^s)$, and $f(w^s)$ in regard to the dimensions in the active computing device.

8. The system of claim 6, wherein the step of summating the current dot products is performed using a first tree-structured scheme, the step of summating the reference dot products is performed using a second tree-structured scheme, and the first tree-structured scheme is significantly different from the second tree-structured scheme.

9. The system of claim 1, wherein the computer executable code is configured to train the federated learning model in the active computing device by:
calculating a local gradient for the instances in the active computing device;
performing in parallel and independently in each of an active worker and at least one passive worker:
picking up one of the instances;
computing a current dot product between a current model weight and the one of the instances;
instructing the at least one passive computing device to compute its current dot product using an instance corresponding to the one of the instances;
summating the current dot products from the active and the at least one passive computing device to obtain summated dot product;
calculating stochastic gradient of the federated learning model using the summated dot product; and
updating the model weight using the stochastic gradient and learning rate of the federated learning model to obtain updated model weight, and updating the local gradient.

10. The system of claim 6, wherein the stochastic gradient is calculated using $$\hat{v}_i^I = \nabla_{G_l} f_i(\hat{w}) - \hat{\alpha}_i^I + \frac{1}{n}\sum_{i=1}^{n} \hat{\alpha}_i^I,$$

$f_i(\hat{w})$ is regularized loss corresponding to loss of the i-the instance, $\nabla_{G_l} f_i(\hat{w})$ is the gradients of $f_i(\hat{w})$ in regard to dimensions of the i-th of the instances in the active computing device, and $\hat{\alpha}_i^I$ is the local gradient in the active computing device.

11. The system of claim 1, wherein the computer executable code is configured to, after the federated learning model is trained, predict a value of an input instance by:
calculating a dot product between model weight and the input instance for each of an active worker and at least one passive worker; and
summating the dot products from the active worker and the at least one passive worker using a tree-structured communication to obtain summated dot product, wherein the summated dot product is the value predicted for the input instance.

12. The system of claim 1, wherein the computer executable code is configured to, after the federated learning model is trained, predict a value of an input instance by:

for each of an active worker and a passive worker:
generating a random number, calculating a dot product between model weight and the input instance, and adding the random number to the dot product to obtain an adjusted dot product;
summating the adjusted dot products from the active worker and the at least one passive worker using a first tree-structured communication to obtain summated adjusted dot product;
summating the random numbers from the active worker and the at least one passive worker using a second tree-structured communication to obtain summated random number; and
subtracting the summated random number from the summated adjusted dot product to obtain summated dot product, wherein the summated dot product is the value predicted for the input instance.

13. A method, comprising:
training a federated learning model in an active computing device, by the active computing device, using dimensions of a plurality of training instances in the active computing device; and
instructing at least one passive computing device to train a federated learning model in the at least one passive computing device, by the at least one passive computing device, using dimensions of the plurality of training instances in the at least one passive computing device,
wherein the active and the at least one passive computing device is in communication with each other, the plurality of training instances in the active and the at least one passive computing devices are indexed, and index of one of the plurality of training instances picked by the at least one passive computing device is independent from index of one of the plurality of training instances picked by the active computing device at the same time, such that training of the federated learning model in the active computing device and training of the federated learning model in the at least one passive computing device are asynchronous.

14. The method of claim 13, wherein parameters of the federated learning models comprise a constant learning rate, and transfer of intermediate results between an active worker and at least one passive worker is performed using a tree-structured scheme via a coordinator in communication with the active and the at least one passive computing device.

15. The method of claim 13, wherein the step of training the federated learning model in the active computing device comprises:
picking up i-th of the training instances in the active computing device, wherein i is the index of the instances;
computing an active dot product between current model weight in the active computing device and the dimensions of the i-th of the training instances in the active computing device;
instructing the at least one passive computing device to compute a passive dot product between current model weight in the at least one passive computing device and the dimensions of the i-th of the instances in the at least one passive computing device;
summating the active and passive dot products to obtain summated dot product;
calculating stochastic gradient of the federated learning model using the summated dot product; and
updating the model weight using the stochastic gradient and learning rate of the federated learning model, wherein the stochastic gradient is calculated using $\hat{v}_i^l = \nabla_{G_l} f_i(\hat{w})$, $f_i(\hat{w})$ is regularized loss corresponding to loss of the i-the instance, and $\nabla_{G_l} f_i(\hat{w})$ is the gradient of the regularized loss in regard to the dimensions in the active computing device.

16. The method of claim 13, wherein the step of training the federated learning model in the active computing device comprises:

for each of a first number of iterations:

calculating a full local gradient for the instances in the active computing device;

performing in parallel and independently in each of an active worker and the at least one passive computing device:

picking up one of the instances;

computing a current dot product between a current model weight and the one of the instances and a reference dot product between a reference model weight and the one of the instances;

instructing the at least one passive computing device to compute its current dot product and its reference dot product using an instance corresponding to the one of the instances;

summating the current dot products from the active and the at least one passive computing device to obtain summated current dot product, and summating the reference dot products from the active and the at least one passive computing device to obtain summated reference dot product;

calculating stochastic gradient of the federated learning model using the summated current dot product and the summated reference dot product; and updating the model weight using the stochastic gradient and learning rate of the federated learning model to obtain updated model weight; and defining the updated model weight as a new reference model weight, wherein the stochastic gradient is calculated using $\hat{v}_i^l = \nabla_{G_l} f_i(\hat{w}) - \nabla_{G_l} f_i(w^s) + \nabla_{G_l} f_i(w^s)$, $f_i(\hat{w})$ is regularized loss corresponding to loss of the i-the instance, $f_i(w^s)$ is regularized loss of the i-th instance in regard to reference model weight, $f(w^s)$ is the regularized empirical risk, and $\nabla_{G_l} f_i(\hat{w})$, $\nabla_{G_l} f_i(w^s)$, and $\nabla_{G_l} f_i(w^s)$ are respectively the gradients of $f_i(\hat{w})$, $f_i(w^s)$, and $f(w^s)$ in regard to the dimensions in the active computing device.

17. The method of claim 16, wherein the step of summating the current dot products is performed using a first tree-structured scheme, the step of summating the reference dot products is performed using a second tree-structured scheme, and the first tree-structured scheme is significantly different from the second tree-structured scheme.

18. The method of claim 13, wherein the step of training the federated learning model in the active computing device comprises:

calculating a local gradient for the instances in the active computing device;

performing in parallel and independently in each of an active worker and at least one passive worker:

picking up one of the instances;

computing a current dot product between a current model weight and the one of the instances;

instructing the at least one passive computing device to compute its current dot product using an instance corresponding to the one of the instances;

summating the current dot products from the active and the at least one passive computing device to obtain summated dot product;

calculating stochastic gradient of the federated learning model using the summated dot product; and updating the model weight using the stochastic gradient and learning rate of the federated learning model to obtain updated model weight, and updating the local gradient, wherein the stochastic gradient is calculated using $$\hat{v}_i^l = \nabla_{G_l} f_i(\hat{w}) - \hat{\alpha}_i^l + \frac{1}{n}\sum_{i=1}^{n} \hat{\alpha}_i^l,$$

$f_i(\hat{w})$ is regularized loss corresponding to loss of the i-the instance, $\nabla_{G_l} f_i(\hat{w})$ is the gradients of $f_i(\hat{w})$ in regard to the dimensions in the active computing device, and $\hat{\alpha}_i^l$ is the local gradient in the active computing device.

19. A non-transitory computer readable medium storing computer executable code, wherein the computer executable code, when executed at a processor of an active computing device, is configured to:

train a federated learning model in an active computing device using dimensions of a plurality of training instances in the active computing device; and instruct at least one passive computing device to train a federated learning model in the at least one passive computing device using dimensions of a plurality of training instances in the at least one passive computing device, wherein the active and the at least one passive computing devices are in communication with each other; and wherein the plurality of training instances in the active and the at least one passive computing devices are indexed, and index of one of the plurality of training instances picked by the at least one passive computing device is independent from index of one of the plurality of training instances picked by the active computing device at the same time, such that training of the federated learning model in the active computing device and training of the federated learning model in the at least one passive computing device are asynchronous.

20. The non-transitory computer readable medium of claim 19, wherein transfer of intermediate results between an active worker and at least one passive worker is performed using a tree-structured scheme via a coordinator, and the coordinator is in communication with the active and the at least one passive computing devices.

* * * * *